(12) United States Patent
Hoefel et al.

(10) Patent No.: US 11,353,029 B2
(45) Date of Patent: *Jun. 7, 2022

(54) ESP PUMP FLOW RATE ESTIMATION AND CONTROL

(71) Applicant: Sensia LLC, Houston, TX (US)

(72) Inventors: Albert Hoefel, Sugar Land, TX (US); Dudi Rendusara, Sugar Land, TX (US)

(73) Assignee: Sensia LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,672

(22) Filed: Jul. 24, 2020

(65) Prior Publication Data

US 2020/0355189 A1 Nov. 12, 2020

Related U.S. Application Data

(63) Continuation of application No. 15/306,380, filed as application No. PCT/US2015/027411 on Apr. 24, 2015, now Pat. No. 10,753,361.

(Continued)

(51) Int. Cl.
*F04D 15/00* (2006.01)
*F04D 1/06* (2006.01)
(Continued)

(52) U.S. Cl.
CPC .......... *F04D 15/0066* (2013.01); *F04D 1/06* (2013.01); *F04D 13/086* (2013.01); *F04D 13/10* (2013.01); *F04D 15/0088* (2013.01); *F04D 29/22* (2013.01); *H02K 5/132* (2013.01); *E21B 43/128* (2013.01); *E21B 47/008* (2020.05); *F05D 2270/335* (2013.01)

(58) Field of Classification Search
CPC .. E21B 43/128; F04D 13/086; F04D 15/0066; F04D 27/00; F04D 29/22
See application file for complete search history.

(56) References Cited

U.S. PATENT DOCUMENTS

| 4,821,580 A | 4/1989 | Jorritsma |
| 5,353,646 A | 10/1994 | Kolpak |

(Continued)

FOREIGN PATENT DOCUMENTS

| EP | 2 120 329 A2 | 11/2009 | |
| EP | 2120329 A2 * | 11/2009 | ............ H02P 23/14 |

(Continued)

OTHER PUBLICATIONS

2007 ESP Workshop Agenda, ESP Workshop: Apr. 26, 2007, The Woodlands, TX, 3 pages.

(Continued)

*Primary Examiner* — Dominick L Plakkoottam

(74) *Attorney, Agent, or Firm* — Foley & Lardner LLP

(57) ABSTRACT

An electric submersible pump system can include a multiphase electric motor operatively coupled to a fluid pump; a multiphase power cable operatively coupled to the multiphase electric motor; and a controller that includes an input that receives measurements as to power supplied to the multiphase electric motor via the multiphase power cable and that processes the measurements to determine information germane to the operation of the electric submersible pump system.

20 Claims, 16 Drawing Sheets

Related U.S. Application Data

(60) Provisional application No. 62/004,799, filed on May 29, 2014, provisional application No. 61/984,474, filed on Apr. 25, 2014.

(51) Int. Cl.
*F04D 13/10* (2006.01)
*F04D 13/08* (2006.01)
*F04D 29/22* (2006.01)
*H02K 5/132* (2006.01)
*E21B 47/008* (2012.01)
*E21B 43/12* (2006.01)

(56) References Cited

U.S. PATENT DOCUMENTS

| | | | |
|---|---|---|---|
| 5,466,127 A | 11/1995 | Arnswald | |
| 5,668,420 A | 9/1997 | Lin et al. | |
| 6,587,037 B1 * | 7/2003 | Besser | F04D 15/0066 340/854.9 |
| 6,590,362 B2 | 7/2003 | Parlos et al. | |
| 6,713,978 B2 | 3/2004 | Parlos et al. | |
| 7,024,335 B1 | 4/2006 | Parlos | |
| 7,117,120 B2 | 10/2006 | Beck et al. | |
| 7,258,164 B2 | 8/2007 | Rezgui et al. | |
| 7,558,699 B2 | 7/2009 | Beck et al. | |
| 8,672,641 B2 * | 3/2014 | Yuratich | H02K 7/09 417/44.11 |
| 10,753,361 B2 * | 8/2020 | Hoefel | F04D 1/06 |
| 2002/0000783 A1 * | 1/2002 | Maceratini | H02P 21/141 318/727 |
| 2004/0064292 A1 | 4/2004 | Beck et al. | |
| 2005/0031443 A1 | 2/2005 | Ohlsson et al. | |
| 2005/0216229 A1 | 9/2005 | Huang et al. | |
| 2006/0052903 A1 | 3/2006 | Bassett | |
| 2006/0259271 A1 | 11/2006 | House et al. | |
| 2006/0276999 A1 * | 12/2006 | Beck | F04B 47/02 702/182 |
| 2007/0150113 A1 | 6/2007 | Wang et al. | |
| 2007/0221173 A1 | 9/2007 | Hazama | |
| 2008/0067116 A1 | 3/2008 | Anderson et al. | |
| 2008/0260540 A1 | 10/2008 | Koehl | |
| 2008/0262737 A1 | 10/2008 | Thigpen et al. | |
| 2009/0000789 A1 | 1/2009 | Leuthen et al. | |
| 2009/0044938 A1 | 2/2009 | Crossley et al. | |
| 2009/0173166 A1 | 7/2009 | Genosar | |
| 2009/0223662 A1 | 9/2009 | Shaw et al. | |
| 2010/0169030 A1 | 7/2010 | Parlos | |
| 2010/0228502 A1 * | 9/2010 | Atherton | F04D 15/0088 702/47 |
| 2010/0247335 A1 * | 9/2010 | Atherton | F04D 15/00 417/53 |
| 2011/0088484 A1 | 4/2011 | Camilleri | |
| 2011/0102012 A1 | 5/2011 | Messersmith et al. | |
| 2011/0106452 A1 * | 5/2011 | Anderson | G01F 1/78 702/6 |
| 2011/0297391 A1 * | 12/2011 | Fielder | H02K 5/132 166/369 |
| 2012/0076667 A1 * | 3/2012 | Patient | F04B 11/00 417/44.1 |
| 2012/0091931 A1 | 4/2012 | Beck et al. | |
| 2012/0098477 A1 | 4/2012 | Gao et al. | |
| 2012/0100014 A1 | 4/2012 | Seitter | |
| 2012/0153883 A1 | 6/2012 | Hammel et al. | |
| 2013/0038123 A1 * | 2/2013 | Wilkins | H02J 13/0079 307/18 |
| 2013/0272898 A1 | 10/2013 | Toh et al. | |
| 2014/0039836 A1 | 2/2014 | Moricca et al. | |
| 2014/0121973 A1 | 5/2014 | Buchanan et al. | |
| 2016/0006481 A1 * | 1/2016 | Rendusara | F04D 1/06 340/854.9 |
| 2017/0089192 A1 * | 3/2017 | Rendusara | F04D 15/0077 |

FOREIGN PATENT DOCUMENTS

| | | |
|---|---|---|
| WO | WO-2009/079363 A2 | 6/2009 |
| WO | WO-2012/039845 A2 | 3/2012 |

OTHER PUBLICATIONS

Brazilian Office Action on BR Appl. Ser. No. BR112016027402-4 dated Jul. 7, 2020 (6 pages) (English Translation).
Camilleri et al., "First Installation of Five ESPs Offshore Romania—A Case Study and Lesson Learned", Petrom-ESP Workshop, Apr. 29-May 1, 2009, The Woodlands, Texas, pp. 1-22.
Camilleri et al., "First Installation of Five ESPs Offshore Romania—A Case Study and Lesson Learned", ESP paper—Lawrence, Society of Petroleum Engineers, SPE Intelligent Energy Conference and Exhibition, Mar. 23-25, 2010, Utrecht, The Netherlands, SPE 127593, pp. 1-25.
First Saudi Arabian Examination Report on SA Appl. Ser. No. 516380134 dated Apr. 17, 2020 (9 pages) (No English Translation).
International Search Report and Written Opinion on PCT Appl. Ser. No. PCT/US2015/027411 dated Aug. 4, 2015 (17 Pages).
International Search Report and Written Opinion on PCT Appl. Ser. No. PCT/US2015/032197 dated Aug. 6, 2015 (11 pages).
Olsen, et al., "Production Allocation Using ESP in the Peregrino Field" SPE Gulf Coast Section Electric Submersible Pump Workshop, The Woodlands, TX Apr. 25-29, 2011, pp. 1-13.
William D. Bolin, Using the Calibrated-Tested Pumping Instrument (Electrical Submersible Pump) For Continuous Fluid Measurement When Producing heavy Oil Wells; ESP Workshop, Apr. 26, 2007, The Woodlands, TX, pp. 1-8.
CA Office Action on CA Appl. Ser. No. 2949533 dated Jun. 11, 2021 (4 pages).
SA Office Action on SA Appl. Ser. No. 516380345 dated Jun. 27, 2021, with English translation (5 pages).
SA Office Action on SA Appl. Ser. No. 516371107 dated Oct. 31, 2021 (11 pages).
BR Office Action on BR Appl. Ser. No. 112016027402-4 dated Feb. 8, 2022 (8 pages).

* cited by examiner

Plant and Reference 900

ESP PUMP FLOW RATE ESTIMATION AND CONTROL

RELATED APPLICATIONS

This application is a continuation of U.S. patent application Ser. No. 15/306,380, filed Oct. 24, 2016, which is a PCT National Phase of International Patent Application No. PCT/US2015/027411, filed Apr. 24, 2015, which claims priority to and the benefit of U.S. Provisional Application having Ser. No. 61/984,474, filed 25 Apr. 2014, and U.S. Provisional Application having Ser. No. 62/004,799, filed 29 May 2014, all of which are incorporated by reference herein.

BACKGROUND

Artificial lift equipment such as electric submersible pumps (ESPs) may be deployed for any of a variety of pumping purposes. For example, where a substance does not readily flow responsive to existing natural forces, an ESP may be implemented to artificially lift the substance. To receive power to power an electric motor, an ESP is connected to a cable or cables, which are, in turn, connected to a power drive. In some instances, an ESP may be deployed with one or more sensors (e.g., a gauge or gauges). Communication of information with ESP equipment may occur via a power cable, which may, depending on type of deployment, be of a length of the order of hundreds of meters or more. Various technologies, techniques, etc., described herein pertain to circuitry, for example, circuitry that may estimate pump flow rate, circuitry that may control pump equipment, etc.

SUMMARY

An electric submersible pump system can include a multiphase electric motor operatively coupled to a fluid pump; a multiphase power cable operatively coupled to the multiphase electric motor; and a controller that includes an input that receives measurements as to power supplied to the multiphase electric motor via the multiphase power cable and that processes the measurements to determine information germane to the operation of the electric submersible pump system. An electric submersible pump system can include a multiphase electric motor operatively coupled to a fluid pump; a multiphase power cable operatively coupled to the multiphase electric motor; and a controller that includes an input that receives measurements as to power supplied to the multiphase electric motor via the multiphase power cable and that processes the measurements to estimate a pump rate of the fluid pump. A method can include exciting a stator current with a constant angle AC current signal where the stator current is supplied to a power cable operatively coupled to an electric motor of an electric submersible pump; based at least in part on the exciting, estimating at least one parameter value of the electric motor; and, based at least in part on the at least one parameter value, controlling the electric motor. One or more computer-readable storage media can include processor executable instructions where the instructions include instructions to instruct an electric submersible pump controller to excite a stator current with a constant angle AC current signal where the stator current is supplied to a power cable operatively coupled to an electric motor of an electric submersible pump; estimate at least one parameter value of the electric motor based at least in part on the excitation; and control the electric motor based at least in part on the at least one parameter value. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
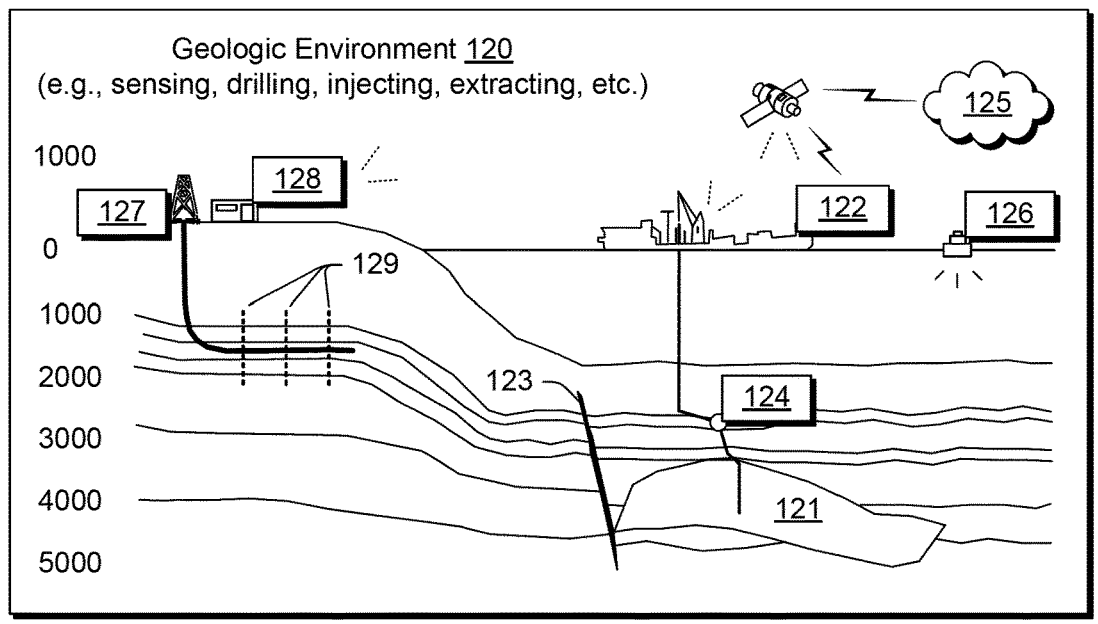
FIG. 1 illustrates examples of equipment in geologic environments.
Figure 1:
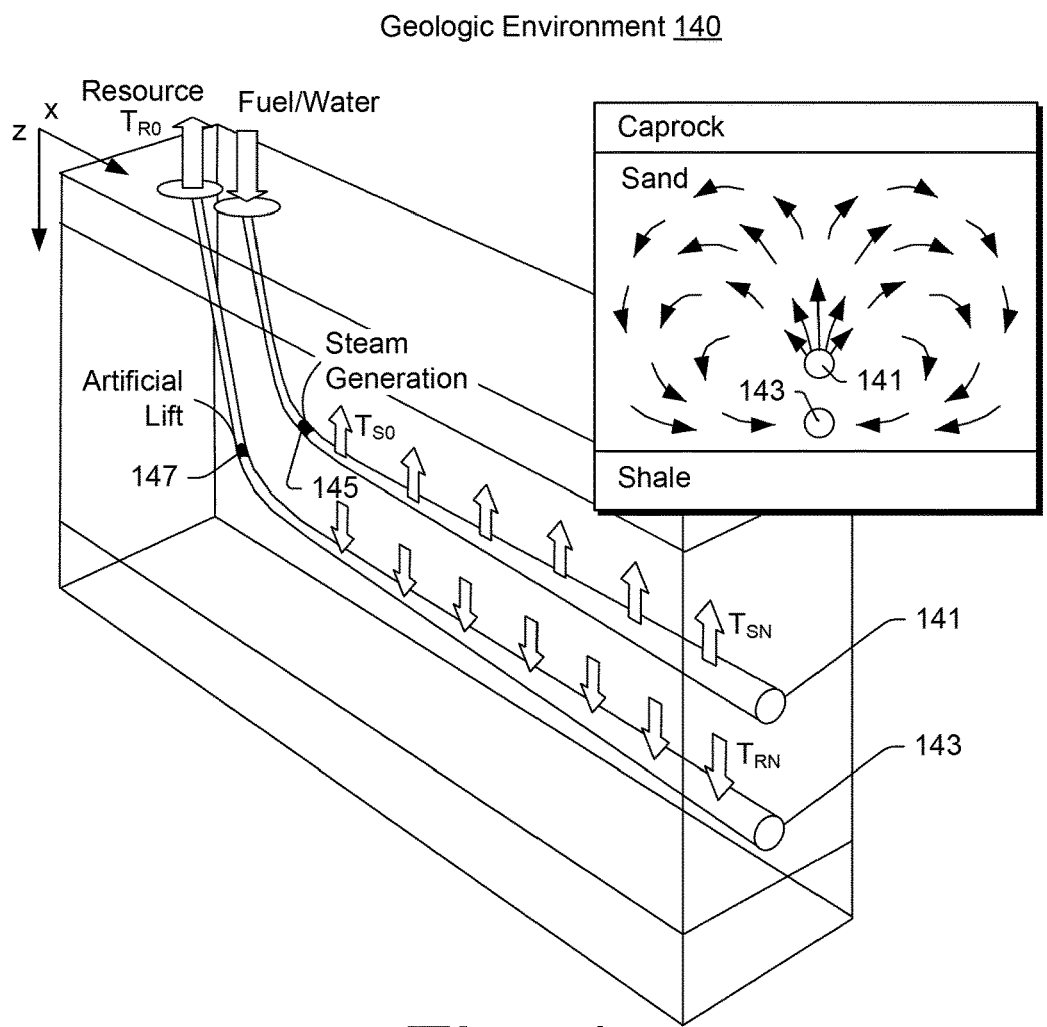

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

An electric submersible pump (ESP) or other downhole equipment may include one or more electric motors. A motor may be driven, for example, via a multiphase power supply and a power cable or cables that provide, for example, a 3-phase AC power signal. As an example, an ESP motor may be coupled to a 3-phase power signal via a balanced inductor network having a neutral, ungrounded node, which may be referred to as a "wye node" or "wye point" of the ESP motor. Voltage and current levels of the 3-phase AC power signal provided by a power supply to an ESP motor may be, for example, of the order of several kilovolts (e.g., or more) and tens of amperes and oscillate at a frequency of the order of about 60 Hz.

Adjustments may be made to an ESP, for example, where the ESP is outfitted with a variable-speed drive (VSD) unit. As an example, a VSD unit can include an ESP controller such as, for example, the UNICONN™ controller marketed by Schlumberger Limited (Houston, Tex.). In combination, a VSD unit with an ESP controller allows for variations in motor speed, which may better manage power, heat, etc.

As an example, an ESP may include one or more sensors (e.g., gauges) that measure any of a variety of phenomena (e.g., temperature, pressure, vibration, etc.). A commercially available sensor is the PHOENIX MULTISENSOR™ marketed by Schlumberger Limited (Houston, Tex.), which monitors intake and discharge pressures; intake, motor and discharge temperatures; and vibration and current-leakage. An ESP monitoring system may include a supervisory control and data acquisition system (SCADA). Commercially available surveillance systems include the ESPWATCHER™ and the LIFTWATCHER™ surveillance systems marketed by Schlumberger Limited (Houston, Tex.), which provide for communication of data, for example, between a production team and well/field data equipment (e.g., with or without SCADA installations). Such a system may issue instructions to, for example, start, stop or control ESP speed via an ESP controller.

As an example, a power cable may provide for delivery of power to an ESP, other downhole equipment or an ESP and other downhole equipment. Such a power cable may also provide for transmission of data to downhole equipment, from downhole equipment or to and from downhole equipment.

Where data is transmitted via a power cable from a "remote" location to a base or other "local" location, the data transmission process may be part of a remote monitoring process. For example, where a downhole electric motor is supplied with 3-phase power via a power cable, a downhole sensor may tap into a wye point of the electric motor to transmit data via the power cable. A remote monitoring process may, for example, monitor various parameters associated with downhole equipment operation, physical phenomena, etc. Such monitoring may facilitate operation of downhole equipment or other equipment (e.g., by an operator, a controller, etc.). For example, as to a downhole ESP, remote monitoring may provide for knowledge of actual values of well parameters related to surrounding reservoir or well bore fluids. A link to communicate monitored data from downhole to uphole may economically be implemented using the same power cable that delivers the electrical power to one or more motors of the ESP (e.g., noting that such a link may be used in a reverse manner to transmit data (e.g., control instructions, etc.) to downhole equipment (e.g., an ESP, a sensor, etc.)).

As to issues associated with ESP operations, a power supply may experience unbalanced phases, voltage spikes, presence of harmonics, lightning strikes, etc., which may, for example, increase temperature of an ESP motor, a power cable, etc.; a motor controller may experience issues when subjected to extreme conditions (e.g., high/low temperatures, high level of moisture, etc.); an ESP motor may experience a short circuit due to debris in its lubricating oil, water breakthrough to its lubricating oil, noise from a transformer which results in wear (e.g., insulation, etc.), which may lead to lubricating oil contamination; and a power cable may experience a issues (e.g. short circuit or other) due to electric discharge in insulation surrounding one or more conductors (e.g., more probable at higher voltages), poor manufacturing quality (e.g., of insulation, armor, etc.), water breakthrough, noise from a transformer, direct physical damage (e.g., crushing, cutting, etc.) during running or pulling operations), chemical damage (e.g., corrosion), deterioration due to high temperature, current above a design limit resulting in temperature increase, electrical stresses, etc.

To understand better how downhole equipment may fit into an overall operation, some examples of processes are described below as applied to basins and, for example, production from one or more reservoirs in a basin.

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP).

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 (e.g., an ESP) may then assist with lifting the resource in the well 143 to, for example, a surface facility (e.g., via a wellhead, etc.). As an example, where a production well includes artificial lift equipment such as an ESP, operation of such equipment may be impacted by the presence of condensed steam (e.g., water in addition to a desired resource). In such an example, an ESP may experience conditions that may depend in part on operation of other equipment (e.g., steam injection, operation of another ESP, etc.).

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

Figure 2:
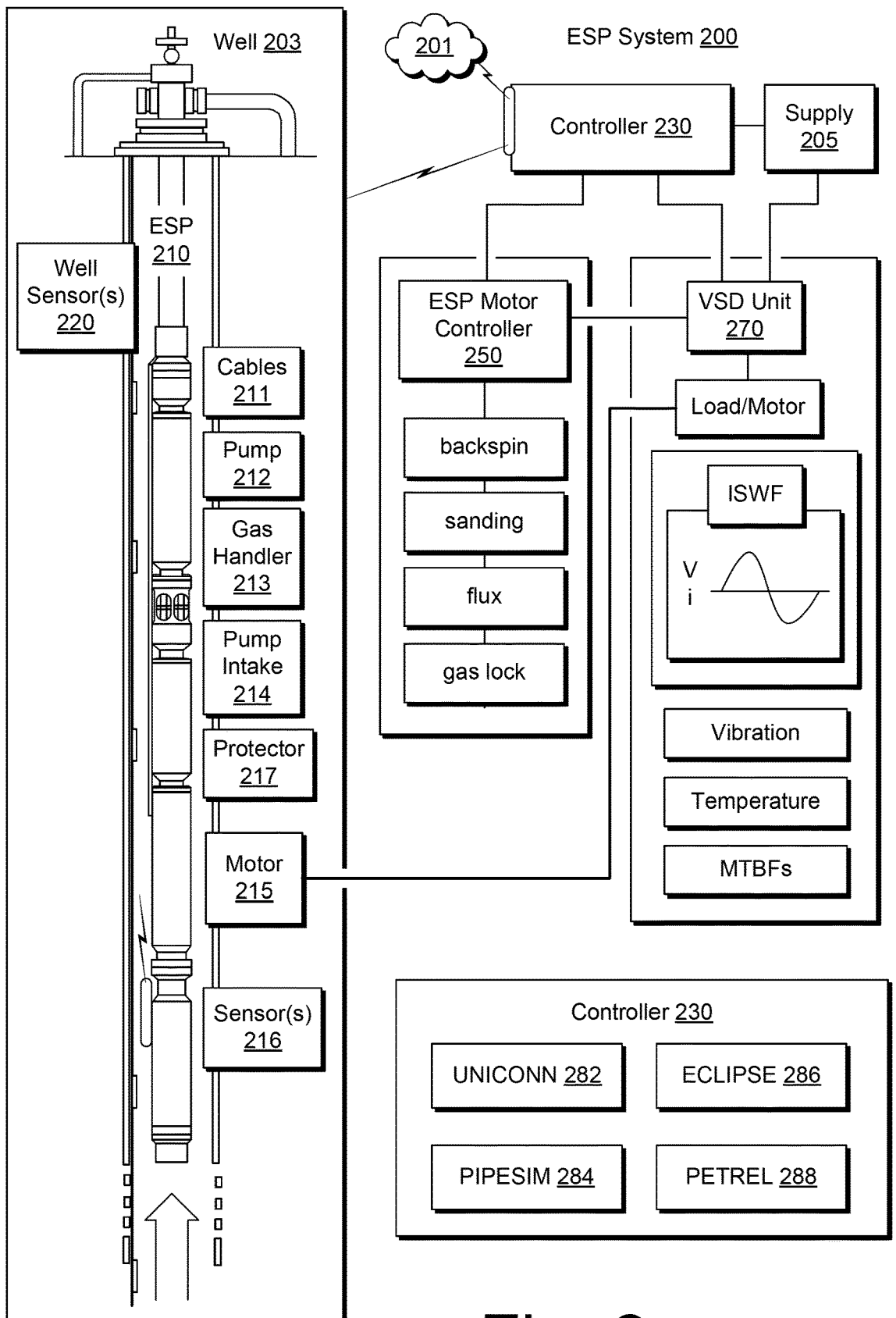
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, commercially available ESPs (such as the REDA™ ESPs marketed by Schlumberger Limited, Houston, Tex.) may find use in applications that call for, for example, pump rates in excess of about 4,000 barrels per day and lift of about 12,000 feet (e.g., about 3,660 m) or more.

In the example of FIG. 2, the ESP system 200 may be coupled to a network 201 and various components may be disposed in a well 203 in a geologic environment (e.g., with surface equipment, etc.). As shown, the ESP system can include a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and optionally a protector 217.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

In the example of FIG. 2, the well 203 may include one or more well sensors 220, for example, such as the commercially available OPTICLINE™ sensors or WELLWATCHER BRITEBLUE™ sensors marketed by Schlumberger Limited (Houston, Tex.). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend thousands of feet into a well (e.g., 4,000 feet or 1,220 m or more) and, for example, beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

As an example, the one or more sensors 216 of the ESP 210 may be part of a digital downhole monitoring system. For example, consider the commercially available PHOENIX™ MULTISENSOR XT150™ system marketed by Schlumberger Limited (Houston, Tex.). A monitoring system may include a base unit that operatively couples to an ESP motor (see, e.g., the motor 215), for example, directly, via a motor-base crossover, etc. As an example, such a base unit (e.g., base gauge) may measure intake pressure, intake temperature, motor oil temperature, motor winding temperature, vibration, currently leakage, etc. As explained with respect to FIG. 4, a base unit may transmit information via a power cable that provides power to an ESP motor and may receive power via such a cable as well.

As an example, a remote unit may be provided that may be located at a pump discharge (e.g., located at an end opposite the pump intake 214). As an example, a base unit and a remote unit may, in combination, measure intake and discharge pressures across a pump (see, e.g., the pump 212), for example, for analysis of a pump curve. As an example, alarms may be set for one or more parameters (e.g., measurements, parameters based on measurements, etc.).

In the example of FIG. 2, the motor controller 250 may be a commercially available motor controller such as the UNICONN™ motor controller. The UNICONN™ motor controller can connect to a SCADA system, the ESPWATCHER™ surveillance system, etc. The UNICONN™ motor controller can perform some control and data acquisition tasks for ESPs, surface pumps or other monitored wells. The UNICONN™ motor controller can interface with the Phoenix™ monitoring system, for example, to access pressure, temperature and vibration data and various protection parameters as well as to provide direct current power to downhole sensors (e.g., the sensors 216). The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Tex.).

Figure 3:
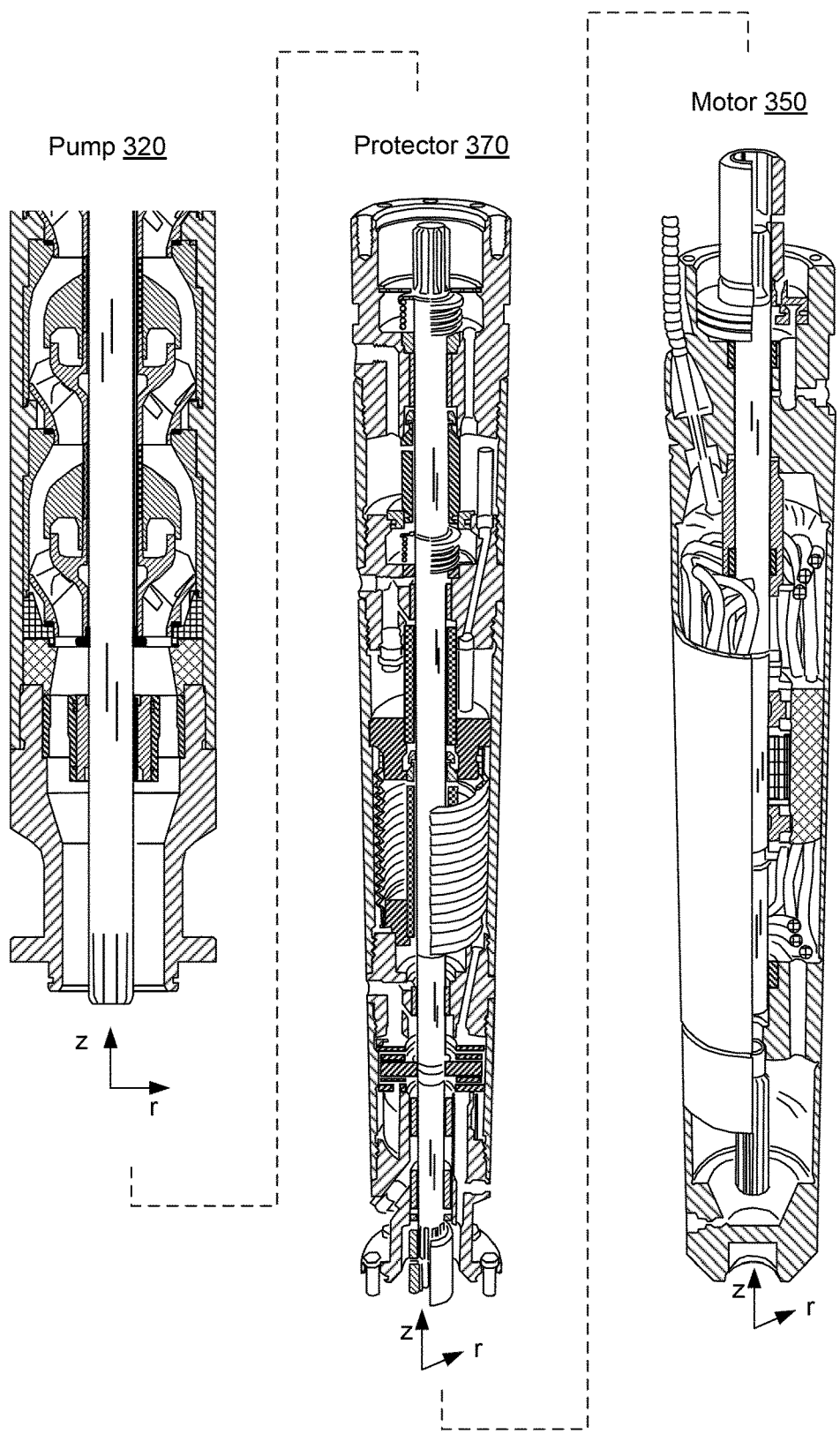
FIG. 3 illustrates examples of equipment.

FIG. 3 shows cut-away views of examples of equipment such as, for example, a portion of a pump 320, a protector 370 and a motor 350 of an ESP. The pump 320, the protector 370 and the motor 350 are shown with respect to cylindrical coordinate systems (e.g., r, z, Θ). Various features of equipment may be described, defined, etc. with respect to a cylindrical coordinate system. As an example, a lower end of the pump 320 may be coupled to an upper end of the protector 370 and a lower end of the protector 370 may be coupled to an upper end of the motor 350. As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle.

Figure 4:
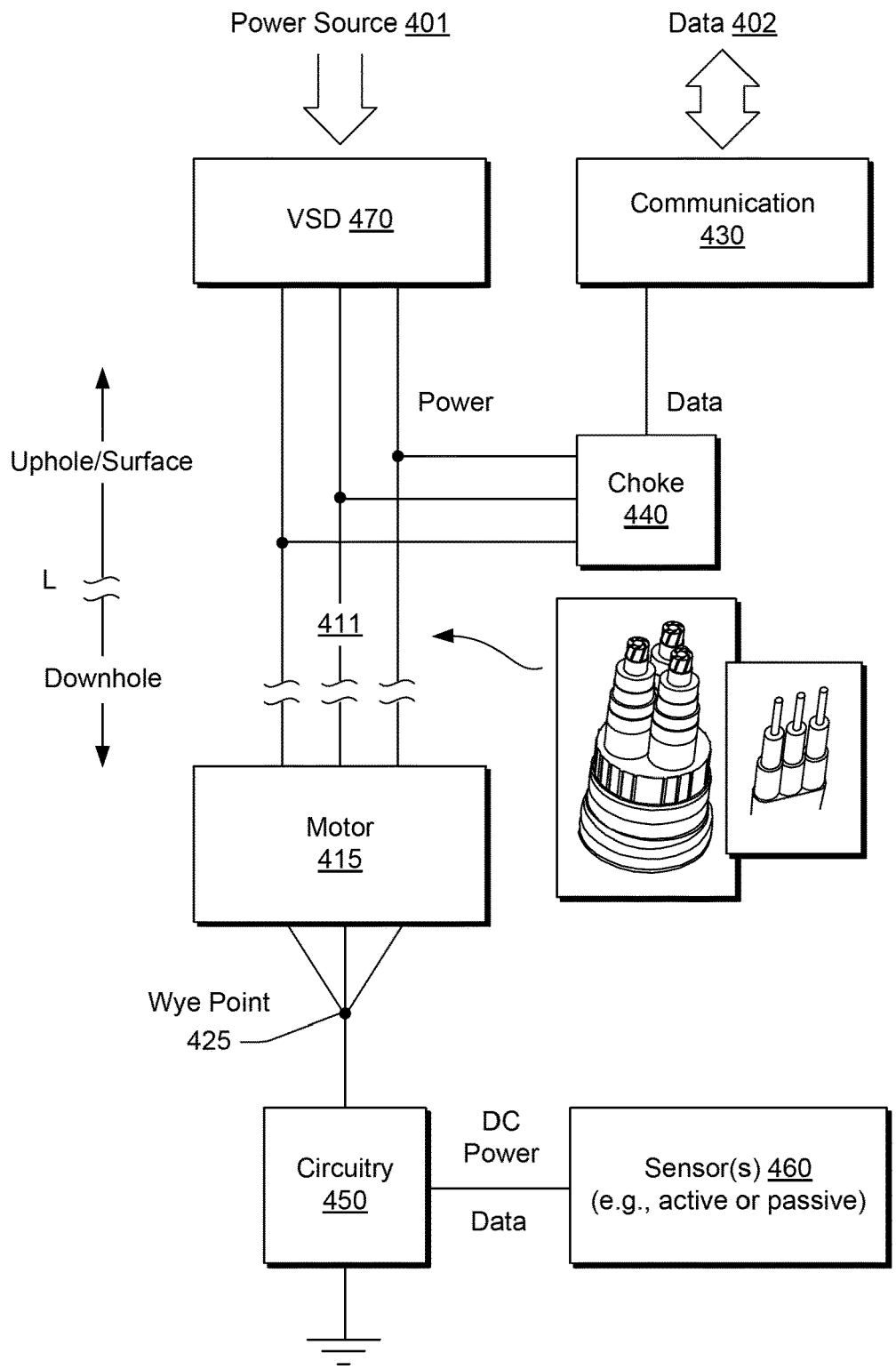
FIG. 4 illustrates examples of equipment.

FIG. 4 shows a block diagram of an example of a system 400 that includes a power source 401 as well as data 402. The power source 401 provides power to a VSD block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor.

As shown, the power cable 411 connects to a motor block 415, which may be a motor (or motors) of an ESP and be controllable via the VSD block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded. While the wye point 425 is shown with three connections, which may correspond to three phases, a multiphase wye point may, as an example, include more than three phases.

As an example, power cables and MLEs that can resist damaging forces, whether mechanical, electrical or chemical, may help ensure proper operation of a motor, circuitry, sensors, etc.; noting that a faulty power cable (or MLE) can potentially damage a motor, circuitry, sensors, etc. Further, as mentioned, an ESP may be located several kilometers into a wellbore. Accordingly, time and cost to replace a faulty ESP, power cable, MLE, etc., can be substantial (e.g., time to withdraw, downtime for fluid pumping, time to insert, etc.).

Commercially available power cables include the REDAMAX™ HOTLINE™ ESP power cables (e.g., as well as motor lead extensions "MLEs"), which are marketed by Schlumberger Limited (Houston, Tex.). As an example, a REDAMAX™ HOTLINE™ ESP power cable can include combinations of polyimide tape, lead, EPDM, and PEEK to provide insulation and a jacket. Lead walls can provide for compatibility with high gas/oil ratio (GOR) and highly corrosive conditions. Armor can mechanically protect the cable and may be galvanized steel, heavy galvanized steel, stainless steel, or MONEL™ alloy. The pothead is an electrical connector between a cable and an ESP motor that may be constructed with metal-to-metal seals. A pothead can provide a mechanical barrier to fluid entry in high-temperature applications.

As an example of a REDAMAX™ HOTLINE™ ESP power cable, a 5 kV round ELBE G5R can include solid conductor sizes of 1 AWG/1, 2 AWG/1 and 4 AWG/1. As another example, a 5 kV flat EHLTB G5F can include a solid conductor size of 4 AWG/1. As to some examples, dimensions may be, for round configurations, about 1 inch to about 2 inches in diameter and, for flat configurations, about half an inch by about 1 inch to about 2 inches.

Figure 5:
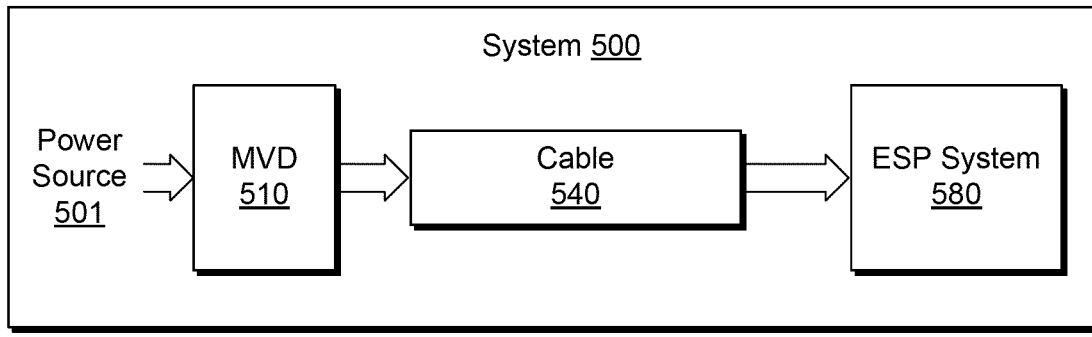
FIG. 5 illustrates an example of a system.
Figure 5:
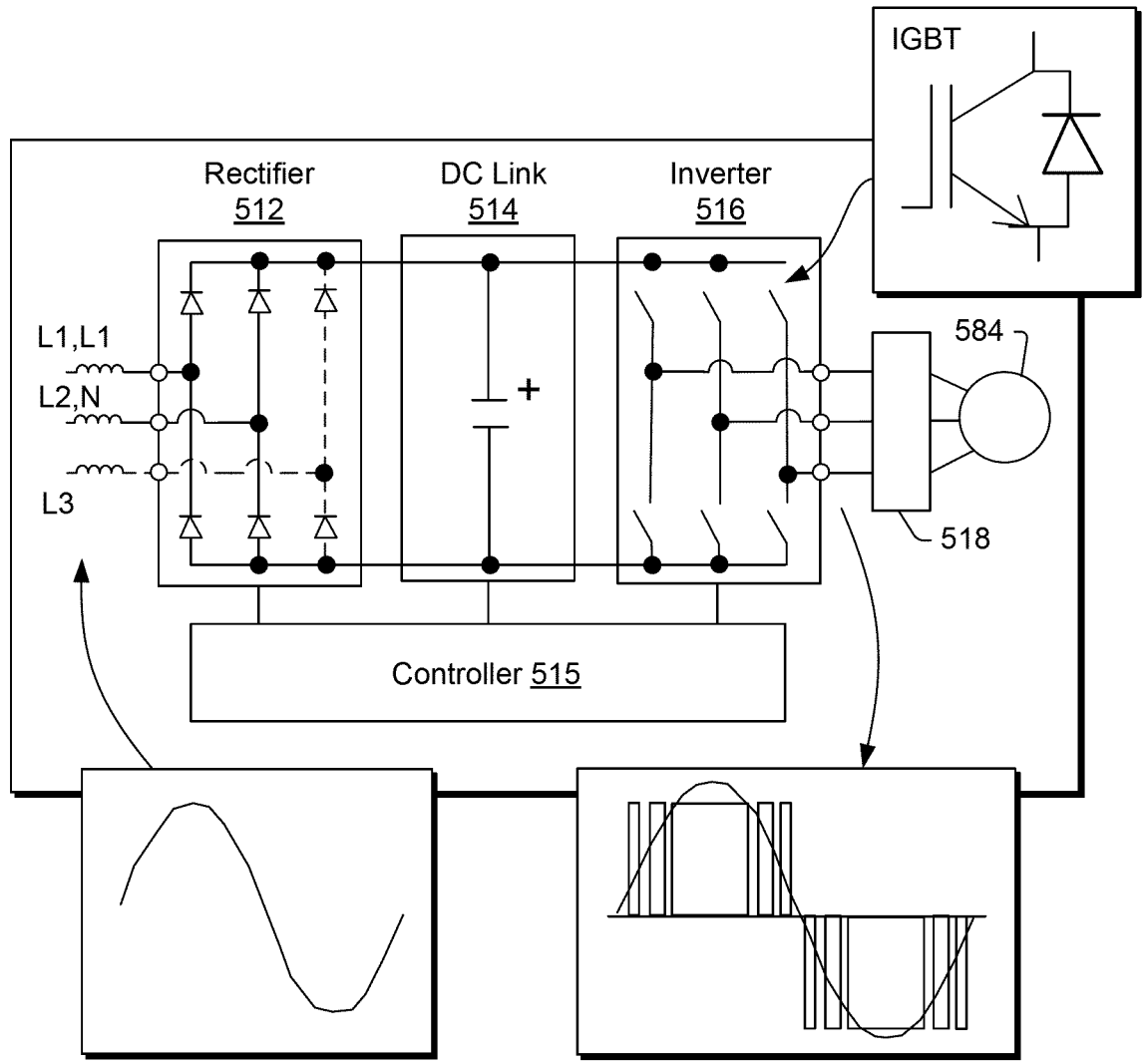

FIG. 5 shows an example of a system 500 that includes a MVD 510, an optional load filter 518, a cable 540 and an ESP system 580. As an example, the cable 540 may be a single cable or multiply strung cables. As an example, a cable or cables may have a length of the order of hundreds or thousands of meters. As to the MVD 510, it may be, for example, a MVD that includes five-level neutral-clamped PWM circuitry or it may be, for example, a MVD that includes cascade circuitry.

As an example, the MVD 510 may include a rectifier 512, a DC link 514, a controller 515 and an inverter 516, which may include insulated-gate bipolar transistors (IGBTs). As indicated in the example of FIG. 5, the optional load filter 518 may be operatively coupled to output from the inverter 516, for example, to help protect equipment such as a motor 584 of the ESP system 580. As shown in the example of FIG. 5, an MVD may include a front end diode rectifier (e.g., AC power source to DC) 512 and a back end PWM controlled IGBT inverter (e.g., DC to "AC") 516, where the load filter 518 connects to the output of the back end PWM controlled IGBT inverter 516 to damp harmonics that can result from switching of the IGBTs.

As an example, a load filter may receive input and filter that input to output a sinusoidal waveform. Without such a load filter (e.g., an unfiltered scenario), depending on various input characteristics, line characteristics, etc., harmonic resonance may occur in an ESP system and result in downhole equipment being exposed to large voltage spikes.

As power disturbances can affect run life of a system (e.g., mean time between failure "MTBE"), a load filter may be applied to provide a clean (e.g., "smooth") harmonics-mitigated sine wave that, in turn, can lessen system stress. Such a filter may, when applied to a drive and compared to an unfiltered drive, prolong run life of an ESP system.

As to harmonics, consider as an example, a waveform with a frequency of 60 Hz, which may be considered a fundamental frequency. Such a waveform may include a harmonic at 1850 Hz, which, in turn, can form a distorted waveform when combined with the fundamental frequency of 60 Hz. As an example, a load filter may filter input to avoid or dampen harmonics, which, in turn, provide a cleaner, less distorted waveform (e.g., a waveform resembling a pure fundamental frequency).

Figure 6:
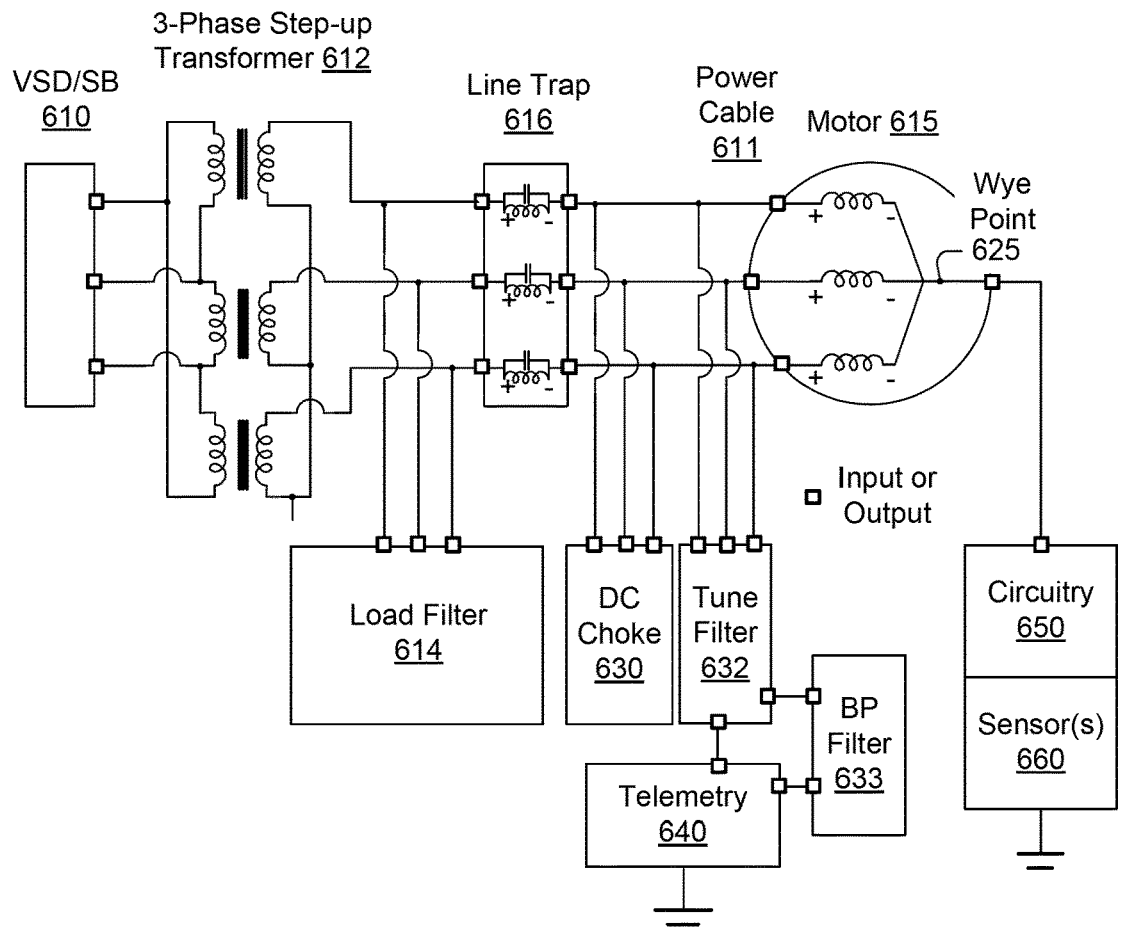
FIG. 6 illustrates an example of a system.

FIG. 6 shows an example of a system 600 and examples of operational scenarios 601, 602, 603, 604, 605, 606, 607, 608 and 609, which may be implemented using one or more forms of circuitry such as one or more forms of circuitry described with respect to FIGS. 7 to 16.

As to the example scenarios, a system may be implemented with circuitry that can estimate downhole pump rate (e.g., optionally without downhole sensors) 601; estimate pump load pressure 602; control pump rate and estimate load pressure 603; estimate motor temperature from one or more rotor time constants 604; implement speed control to reduce shaft oscillation 605; efficiently run a motor (e.g., on a long cable) with better motor efficiency and less cable losses 606; improve stability, lessen distortion on excitation signals and lessen uncontrolled over current trips 607; implement a model-based and robust startup strategy with better stability 608; and implement a model-based event detection mechanism that may detect sudden load torque change, stalling, etc. 609. Where estimation may be mentioned, or estimates, such estimation or estimates may be determinations, for example, of values, events, etc. For example, information may be input to an input of a machine and processed by the machine to generate an output, which may be a value, a signal, etc. Such output may be considered a determination. As an example, output may be part of a control mechanism, for example, where output may be an input to a controller or other piece of equipment.

As shown in the example of FIG. 6, the system includes a variable speed drive or switch board (VSD/SB) 610, a power cable 611, a multiphase step-up transformer 612, a load filter 614, a multiphase electric motor 615 that includes a wye point 625 (e.g., a point where electrical connections exist from multiple phases), DC choke circuitry 630, telemetry circuitry 640, circuitry 650 operatively coupled to the wye point 625 and one or more sensors 660. As shown, the system 600 may include a line trap 616, may include a tune filter 632, may include a band pass filter 633, etc.

As an example, a method may relate to operation of artificial lift pumps at controlled (or estimated) speeds and known actuation torque based on phase voltage and current measurements at surface. As an example, artificial lift equipment may be driven by a downhole pump coupled via a shaft to a downhole electric motor. In such an example, pumping operation may be part of motor cooling (e.g., as fluid may transfer heat from a motor to the fluid). A motor may be powered from surface through a long cable from a surface PWM controlled motor driver. As an example, to avoid reflections, high PWM frequency contents may be filtered out, for example, by a line filter (e.g., one or more forms of circuitry that are electrically coupled to one or more lines). As an example, in some cases a driver may be isolated via a transformer.

As an example, a cable may be lack symmetry (e.g., a cable may be considered to be asymmetrical). For example, once deployed in a downhole environment, cable temperature, motor stator and rotor temperature distribution may not be known (e.g., at a level of desirable precision, etc.) and may vary spatially with respect to various components of a cable. In such an example, spatial variations can cause asymmetries in properties of conductors within a cable, which may, in turn, effect transmission of energy to a multiphase electric motor. As spatial variations increase, asymmetry can likewise increase, which may cause a relatively balanced supply to a supply end of a cable to become unbalanced at an electric motor end of the cable. As an example, temperatures along and within a cable can be based on one or more heat transfer mechanisms, which may be related to one or more of formation fluid temperature, pump rate, heat transfer properties of motor and cables and heat transfer properties of pumped fluid (e.g., which may be single or multiphase). As dielectric properties of a cable may depend on temperature, spatial differences in temperature may affect one or more conductors of a cable, one or more insulators of a cable, etc., in a manner that can cause unbalance (e.g., asymmetry).

As an example, an "ideal" model of a power distribution system may assume that a "balance" of multiphase input to individual phases of a multiphase cable is retained over the length of the multiphase cable, however, as explained above, where a multiphase cable is exposed to conditions that may vary over its length, such an assumption may lead to erroneous estimations as to output of the individual phases of the multiphase cable, particularly where a multiphase cable is of a considerable length (e.g., as may be associated with an ESP deployed in a well of a geologic environment). Thus, motor control and motor speed estimator methods that are based on a symmetrical motor model with fairly well-known motor parameters and with short cables may be unsuitable for estimation of one or more conditions associated with an ESP system, especially as cable length of such a system is increased.

As an example, a model-based approach may provide for control of equipment via one or more estimations, which may account for various "non-idealities" of an ESP system (e.g., factors that may be neglected by other approaches). As an example, a model-based approach may include a model that models features such as a motor driver, an isolation transformer, a line filter, etc. As an example, a model-based approach may include a cable and motor model in a speed tracking filter (speed estimator) and a plant model for motor control. As an example, in an initial phase of system identification, a combined non-linear and un-symmetric stator line filter, transformer, cable and motor bulk impedance model may be generated that includes a bulk leakage inductance, bulk serial stator resistance and motor magnetization inductance matrix. As an example, variation of combined resistance may be tracked during operation, for example, by injecting a low frequency tone superimposed to the regular operation. A stator modeling approach may be taken for permanent magnet synchronous motors (PMS) and induction motors (IM). As an example, speed and position observers may differ based on motor type. For example, speed and position observers may be adaptive to respond on resistance change over time and to minimize estimator error. As an example, an approach may aim to control a system at a target speed via a closed loop speed controlled operation where, for example, motor speed may be well-defined (e.g., related to pump flow) as well as actuation torque (e.g., related to load pressure).

As an example, a system can include speed and position observers that are adaptive such that they can respond on resistance change over time and to minimize estimator error. In such an example, at a target speed a closed loop speed controlled operation may be implemented using motor speed related to pump flow and actuation torque related to load pressure. As an example, a system may implement a closed loop control scheme once a particular motor speed has been reached, which may be a motor speed that is sufficiently high to provide a desired signal to noise ratio (e.g., a signal noise ratio high enough for closed loop control via a speed tracking mechanism).

As an example, an approach may be taken that operates in an open loop manner, for example, consider open loop motor operation for IM motors with a tracking filter delivering an estimate of flow speed and actuation torque. In such an example, if an off the shelf motor driver is used, access to PWM signals may not be available; however, from voltage and current measurements driven torque and speed may be estimated. As an example, such an approach may account for, or recognize that, dynamic estimation of cable and motor resistance may be a possible source of error (e.g., less quantifiable, etc.).

Figure 7:
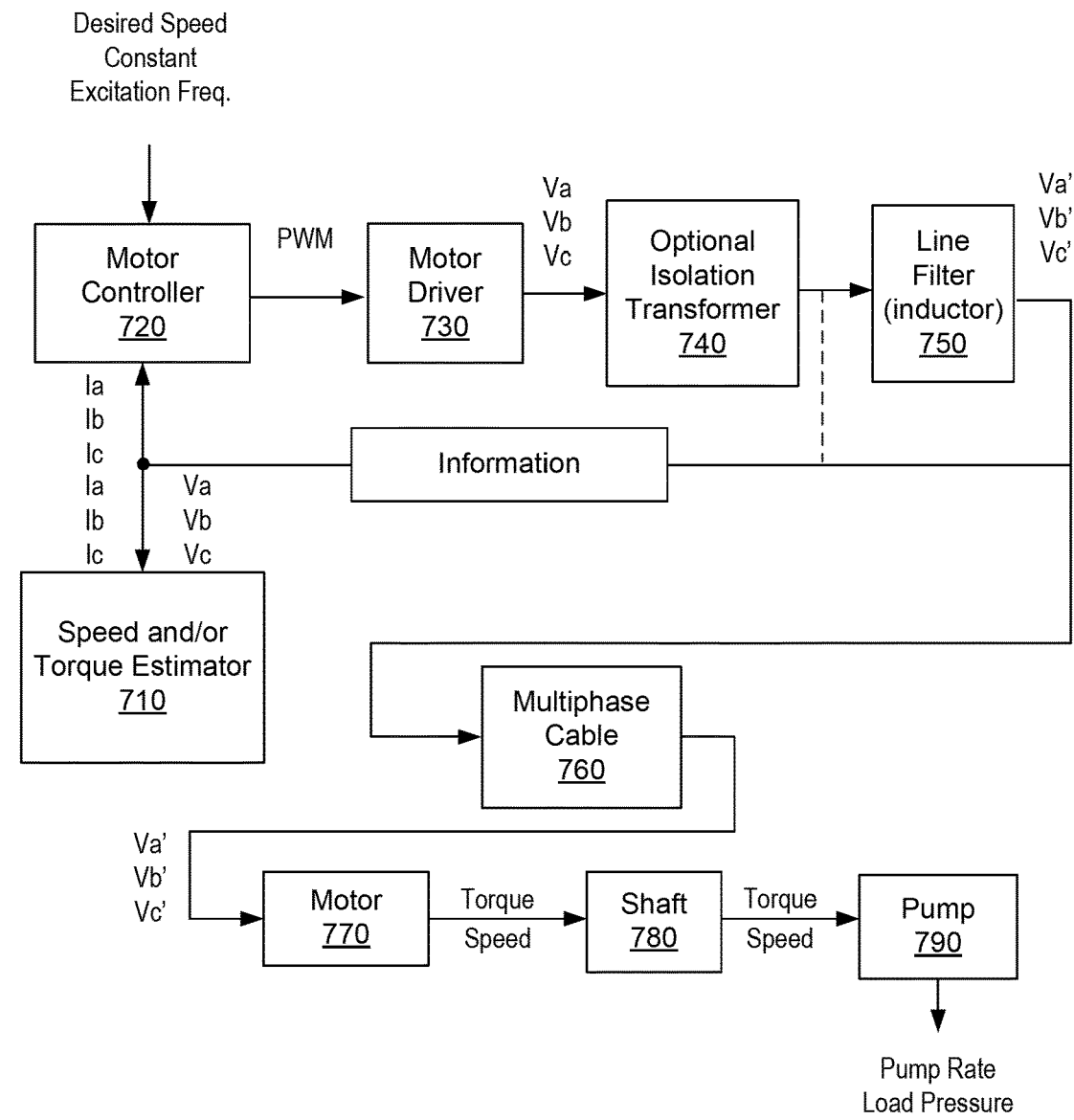
FIG. 7 illustrates an example of a system.
Figure 7:
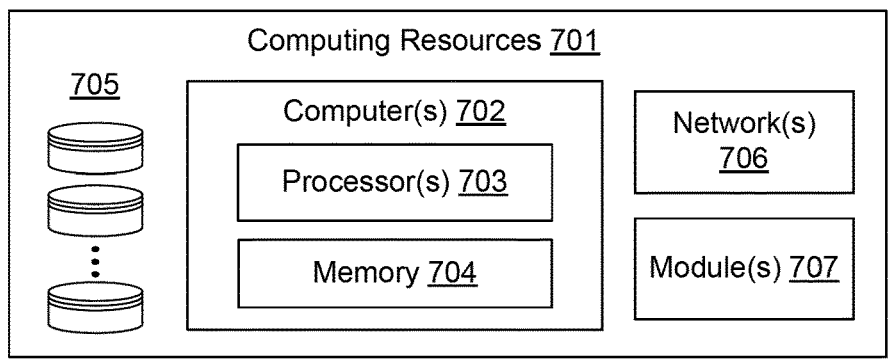

FIG. 7 shows an example of a system 700 and examples of computing resources 701. The computing resources 701 may include one or more computers 702, one or more storage devices 705, one or more networks 706 and one or more modules 707. As to the one or more computers 702, each computer may include one or more processors (e.g., or processing cores) 703 and memory 704 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 705 where the computer(s) 702 may access the data via the network(s) 706 and process the data via the module(s) 707, for example, as stored in the memory 704 and executed by the processor(s) 703. As an example, a computer-readable storage medium may be non-transitory and not a carrier wave. Such a storage medium may store instructions and optionally other information where such instructions may be executable by one or more processors (e.g., of a computer, computers, a controller, controllers, etc.).

In FIG. 7, the system 700 is shown as a block diagram of an ESP system. As an example, such a system may run closed loop, for example, with a control loop algorithm running inside the motor controller that tries to adjust the speed of the motor to a given desired speed or in an open loop. As shown, the system 700 can include a speed and/or torque estimator 710, a motor controller 720, a motor driver 730, an optional isolation transformer 740, a line filter 750, a multiphase cable 760 (e.g., consider a three-phase cable), a motor 770, a shaft 780 (e.g., single or multipiece, etc.) and a pump 790. As shown, information may be transmitted to the speed and/or torque estimator 710 and/or to the motor controller 720. Such information, as shown, can include voltage and current information. As indicated, such information or one or more portions thereof may be available at one or more points in an electrical power distribution system (e.g., prior to the line filter, as part of the line filter, after the line filter, etc.).

In the example of FIG. 7 the system 700 can be an electric submersible pump system that includes the motor 770 as a multiphase electric motor operatively coupled to the pump 790 as a fluid pump; the multiphase power cable 760 operatively coupled to the motor 770; and the controller 720 as part of a controller that includes an input that receives measurements as to power supplied to the motor 770 via the multiphase power cable 760 and that processes the measurements to estimate a pump rate of the pump 790.

As shown in FIG. 7, current and voltage information (e.g., via measurements, etc.) may be received by the speed and/or torque estimator and at least current information may be received by the motor controller 720.

As an example, in open loop operation a motor may not run in a controlled way. For example, for induction motors (IM) motor speed will settle based on the produced actuation torque and the load torque; whereas, for permanent magnet synchronous motors (PMS) motors, if driven with high enough excitation currents the motor rotor will follow synchronous to the excitation frequency. However the load and actuation torque may not be very well known.

As an example, a system may be configured with circuitry to operate in a closed loop manner. For example, such a system may include one or more motors, which may include one or more of an induction motor (IM) and/or a permanent magnet synchronous motor (PMS). As an example, a system may include a control algorithm and speed and position estimator that can run in a motor controller (e.g., via circuitry, which may include a processor, memory, instructions stored in memory and executable by the processor, etc.). As an example, excitation voltage may be known from driven PWM signals, except for motor driver "non-idealities". As an example, a system may include measuring current and operating a closed loop controller based on measured current (e.g., optionally as a single input measure).

As an example, a system may include an off the shelf motor drive that may have no access to PWM inputs. In such an example, voltages and currents can be measured and the motor speed and actuation torque can be estimated from the voltage and current measurements. As an example, such an approach may be implemented for a system that includes one or more IM motors.

As an example, a system may include circuitry that can reduce the effect of cable asymmetry. For asymmetrical cables, particularly for flat cables, where the phases are laid out side by side, the inductance can be unsymmetrical. For resistance, if the cable diameters are matched, the mismatch may be mainly related to temperature. To address asymmetry, as an example, an approach may consider compensation of the serial drop based on the nominal cable parameters; compensation of the unsymmetrical portion of the drop; and/or fuller compensation by combination of the transformer, line filter, cable and stator impedance.

Figure 8:
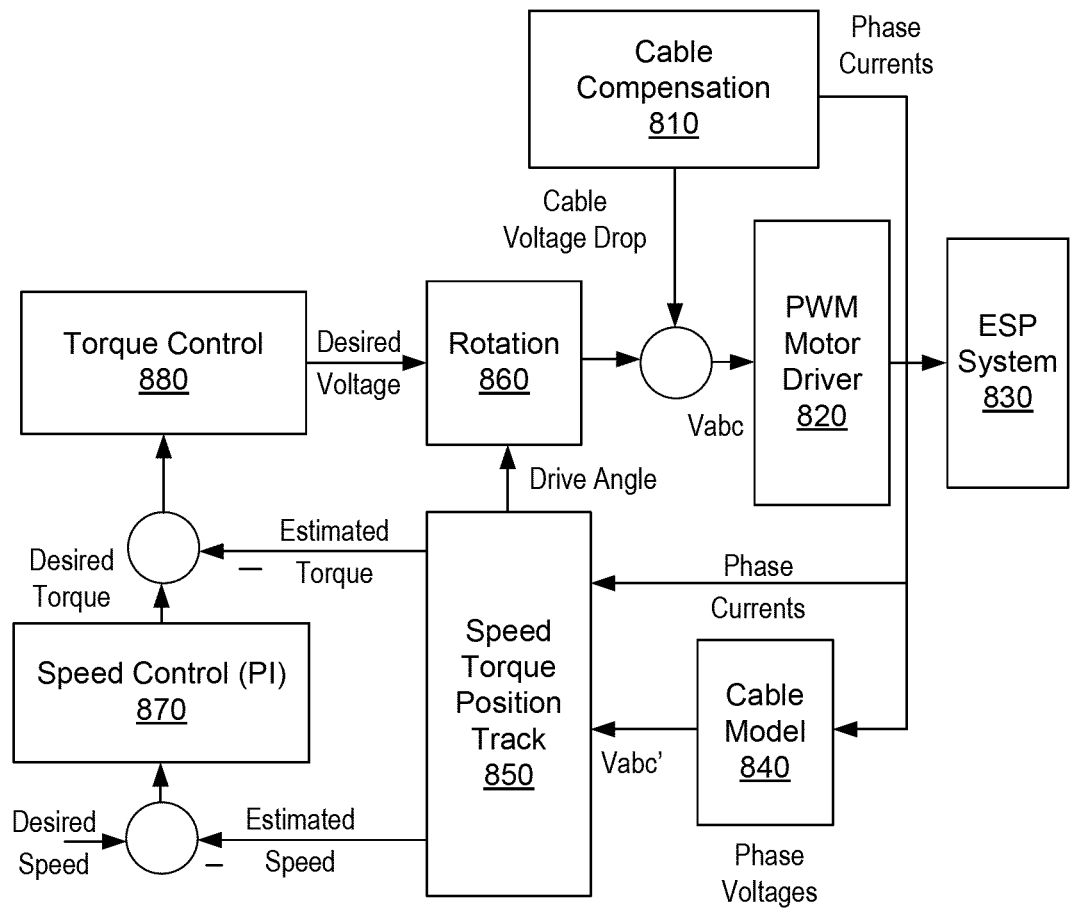
FIG. 8 illustrates an example of a system.

FIG. 8 shows an example of a system 800 for pilot control for cable compensation. As shown, the system includes a cable compensation block 810, a PWM motor driver block 820, an ESP system block 830, a cable model block 840, a speed, torque and position track block 850, a rotation block 860, a speed control block 870 (e.g., consider PI control), and a torque control block 880.

Compensation for cable drop may be based on nominal cable parameters. For example, in the example of FIG. 8, consider control and tracking based on motor terminal voltages. In such an example, the control loop can then run on the symmetrical motor model.

As an example, to get from the desired voltage Vabc' of a torque (and for IM motors also flux) control loop at the motor terminals to the driver voltage Vabc the serial cable drop can be added.

$$Vabc=Vabc'+Zcable*Iphase$$

where Zcable may be a 3 by 3 matrix (e.g., for three-phase), which describes the Laplace transform of the serial impedance, which includes the resistance, and the inductance (including mutual inductance) and if appropriate also capacitance.

As a next process after measurement of the phase currents, the motor terminal voltage, as for a tracking algorithm and control, may be calculated from an inverse relationship, for example, as follows:

$$Vabc'=Vabc-Zcable*Iphase$$

As to pilot control, as an example, an approach may consider compensation of the unsymmetrical portion of the cable drop. In such an example, an approach can include compensating for the unsymmetrical part of the cable impedance. Such an approach may consider the fact that the loop area of the mutual inductance of the two outer conductors is larger than the mutual inductance of the inner line to the two outer lines (e.g., in a three-phase scenario). In such an example, the symmetrical part of the cable impedance can be combined with the motor stator input impedance, for example, as follows:

$$Zcable=Zcable\_sym+Zcable\_unsym$$

In such an approach, it may be relatively straightforward to track change in cable resistance, to implement tracking and control on a symmetrical model while still compensating for the unsymmetrical part through pilot control.

As an example, an approach may consider fuller compensation by combination of the transformer, line filter, cable and stator impedance (e.g., a full compensation approach). While such an approach may be more accurate as to tracking and control, it introduces additional complexity. More powerful and more dynamic tracking and control algorithms tend to be based on rotor coordinates, they describe stator voltages, currents and rotor flux relative to the rotor, not the stator. The high complexity can relate to higher challenges on debugging operational problems.

In a system identification approach, various parameters of an ESP system can vary over time and from setup to setup. As an example, a model variation can be accounted for in different categories. In an initial phase before pump operation various parameters can be identified without actually running a pump. They can be measured and used for tracking and control. On the other hand there are parameters that vary over time particularly, because they are affected by temperature. For example, consider cable resistance and motor and stator resistance as being temperature dependent. Further, where temperature varies spatially as well as temporally, such parameter may vary spatially and temporally as well, which may lead to asymmetries in multiphase power supply to a motor that can vary over time.

As an example, a system may aim to provide consistency between model parameters and corresponding physical system components, which can thereby facilitate control, regulation, tracking, etc. For example, where a system includes an ESP operatively coupled to a power cable that is operatively coupled to a drive unit, a method can include providing model parameters that correspond to various aspects of the system. In such an example, parameter errors may be analyzed as to estimation errors of estimated speed, estimated applied torque, real time cable/stator and rotor resistance estimation.

As to line inductance, initial resistance and magnetization, consider bulk inductance of an optional transformer, line filter, cable and motor stator, which may be readily measured by injecting a stator voltage signal at a constant drive angle. As an example, amplitude can be modulated at different frequencies. As an example, measurement can be repeated for different directions for instance in A, B and C direction. Also consider, as an example, that with constant drive angles no voltage is induced into the rotor, it will not move and have no impact.

As an example, a measurement can be superimposed with a DC component. By the measurement of the phase current, three parameter sets can be identified as DC resistance in A, B and C directions and inductance including saturation effects on the inductance in A, B and C directions.

As an example, before starting a new installation, inductance measurements may be combined with magnetization measurements of the motor standalone and the line filter stand alone.

As to real time identification, methods can be applied while actively operating the motor. On top of the normal excitation currents a superimposed AC current signal with a constant angle (only for closed loop control) can be applied to gain more information for parameter identification. For open loop operation however the injection of an extra excitation tends to be not as controlled.

As an example, a method can include a system identification process for model validation and tuning and can include a discrepancy identification process for identifying discrepancies between the model and a real system, for example, to determine health of the real system. For example, consider a system test or tests that can include diagnosis and health monitoring over time. As an example, reduction of cable/stator inductance may be an indicator of one or more shorts in a winding or windings. As another example, a change in resistance or a change in common mode leakage currents may indicate a developing break down of cable insulation.

As an example, a method can include operating a controller that includes an input that receives measurements as to power supplied to a multiphase electric motor via a multiphase power cable and that processes the measurements to estimate one or more variables associated with the multiphase electric motor; and using the one or more variables associated with the multiphase electric motor to vary operation of the multiphase electric motor so as to improve the run life of the multiphase electric motor.

Figure 9:
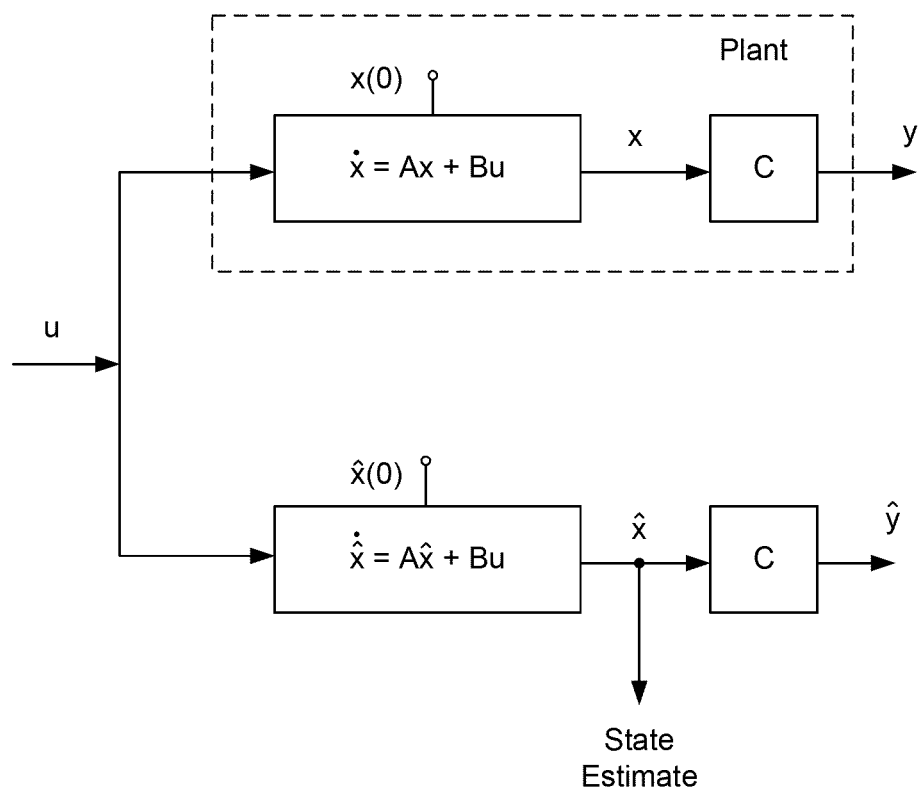
FIG. 9 illustrates an example of a plant and reference.
Figure 10:
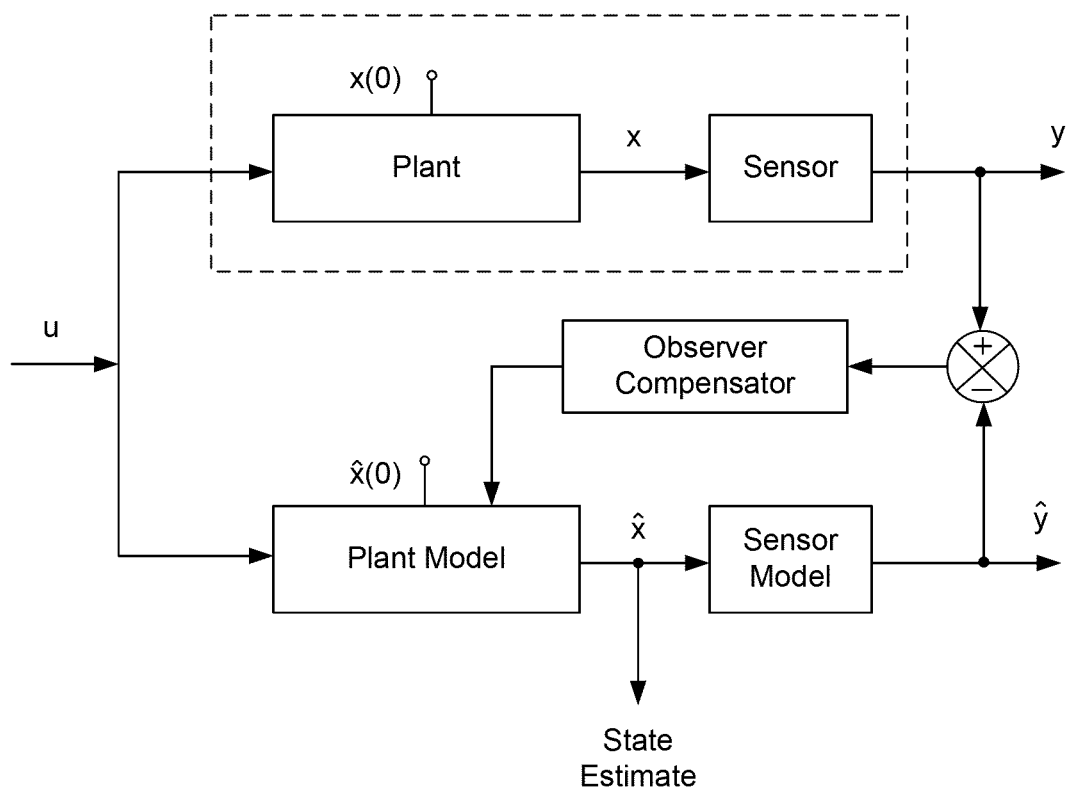
FIG. 10 illustrates an example of an observer.

As an example, an approach may include an adaptive Luenberger observer structure. FIG. 9 shows an example of a plant and reference 900 while FIG. 10 shows an adaptive Luenberger observer 1000. For motor operation with long cables with time varying parameters and potential asymmetries, an approach may include tracking of variation through adaptive filters. For electrical motors adaptive filters tend to be based on current or flux prediction. The prediction is based on a continuous correction of the system state variables and system parameters based on the prediction error. Classical Luenberger observers use the measurement vector prediction error to adjust the system state variables. Adaptive Luenberger observers also use the prediction error to adjust the system parameters as well. Particularly for a tracking filter with long cables and strong impact of temperature the fact that the reference model parameters subject to wide variation may have a dominating impact on the quality of the result.

As an example, consider a real system described in state space by the system model:

$$\frac{dx}{dt} = \underline{A}\,\underline{x} + \underline{B}\,\underline{u}$$

where $\underline{x}$ is the system variable vector, $\underline{A}$ include the system parameters, $\underline{u}$ describes the excitation and $\underline{B}$ the sensitivity of the system variables to the excitation.

A tracking model may be described in a similar way, but including a correction term.

$$\frac{d\hat{\underline{x}}}{dt} = \hat{\underline{A}}\,\hat{\underline{x}} + \hat{\underline{B}}\,\underline{u} + \underline{G}(\underline{y} - \underline{y}^*)$$

In the foregoing equation, the vector $\underline{y}$ describes the measurement vector and $\underline{y}^*$ its predicted value. The matrix $\underline{G}$ is the feedback gain that gives a weight and sign to the prediction error feedback. The "^" sign in the matrix $\hat{\underline{A}}$ and $\hat{\underline{B}}$ indicate that they are idealized or estimated values of the physical system. While this is a vector approach for Luenberger, for sensorless control of motors on long cables; as an example, the system matrix $\underline{A}$ can be dynamically adapted based on one or more operational conditions.

As an example, for IM motors, an adaptive Luenberger observer structure approach may be implemented. There are many tracking filter structures for sensorless motor control of induction motors. For the application on long cables however the parameter variation is large and may degrade quality of speed estimation. The bulk resistance of the filter, cable and stator may change with temperature and have to be tracked. Also rotor resistance can change with temperature. Therefore, as an example, an approach may account for rotor and stator resistance as well in a comprehensive tracking structure.

As an example, consider a system variable vector approach where vectors may be defined as follows:

$$\underline{x} = [I_{ds}, I_{qs}, \phi_{dr}, \phi_{qr}]^T$$

$$\underline{u} = [V_{ds}, V_{qs}]^T$$

where $I_{ds}$, $I_{qs}$ are the stator currents in the stationary reference frame and $\phi_{dr}$, $\phi_{qr}$ are the rotor flux variables.

$$\underline{A} = \begin{bmatrix} -\left\{\frac{R_s}{\sigma L_s} + \frac{(1-\sigma)}{\sigma \tau_r}\right\}I & \frac{M}{\sigma L_s L_{sr}}\left\{\frac{1}{\tau_r}I - \omega_r J\right\} \\ \frac{M}{\tau_r}I & -\frac{1}{\tau_r}I + \omega_r J \end{bmatrix}$$

$$\underline{B} = \left[\frac{1}{\sigma L_s}I\ 0\right]^T$$

$$\underline{C} = [I\ 0]^T$$

$$I = \begin{bmatrix} 1 & 0 \\ 0 & 1 \end{bmatrix}\ J = \begin{bmatrix} 0 & -1 \\ 1 & 0 \end{bmatrix}$$

$R_s$, $R_r$: Stator and rotor resistance $L_s$, $L_{sr}$: Stator and rotor self inductance $M$: Mutual inductance $\sigma$: Leakage coefficient $\sigma = 1 - M^2/(L_s L_{sr})$ $\tau_r$: Rotor time constant $\tau_r = L_r/R_r$ $\omega_r$: Rotor angular velocity As an example, based on a Lyapunov function it can be shown that the system is stable for the right selection of the feedback matrix $\underline{G}$ (e.g., as part of a "correction" term that can provide weight and sign to a feedback error).

As an example, stator and rotor resistance can be estimated by a scheme that can include the following equations:

$$\frac{d\hat{R}_s}{dt} = -\lambda_1 \left(e_{ids}\hat{i}_{ds} + e_{iqs}\hat{i}_{qs}\right)$$

$$\frac{d\left(\frac{1}{\hat{\tau}_r}\right)}{dt} = \frac{\lambda_2}{L_r}\left\{e_{ids}(\hat{\phi}_{dr} - M\hat{i}_{ds}) + e_{iqs}(\hat{\phi}_{qr} - M\hat{i}_{qs})\right\}$$

$e_{ids}$, $e_{iqs}$: current prediction errors $\lambda_1$, $\lambda_2$: filter constant As an example, filter constants can determine dynamics of tracking as well as, for example, sensitivity to noise. Since stator and rotor resistance may not change as fast, slow resistance tracking may be sufficient. As an example, too fast resistance tracking can bare a high risk of oscillation, for example, based on the impact of the overall tracking.

As an example, a scheme to estimate stator and rotor resistance may be underdetermined for steady state operation. Therefore, an additional tone can be superimposed to the excitation. A scheme of induction motor control may be understood as follows: rotor flux is controlled through a stator current $i_{ds}$, which is low pass filtered by the rotor time constant $\tau_r$ to get to the rotor flux, and the stator current $i_{qs}$ is used for dynamic torque control. By an excitation to modulate $i_{ds}$ the impact of the rotor time constant can be measured; noting that a modulation of $i_{qs}$ is dominated by the stator resistance. The excitation for $i_{ds}$ may be selected to be fast enough to see an impact on the rotor time constant. In such an approach, both excitations can lead to additional torque ripple.

As to speed tracking estimation, consider, as an example, the following equation:

$$\hat{\omega}_r = k_p(e_{ids}\hat{\phi}_{qr} - e_{iqs}\hat{\phi}_{dr}) + k_i\int(e_{ids}\hat{\phi}_{qr} - e_{iqs}\hat{\phi}_{dr})dt$$

Based on a tracked velocity, that is based on a rotor time constant and stator resistance, one or more methods of vector oriented control (VOC) may be implemented.

Figure 11:
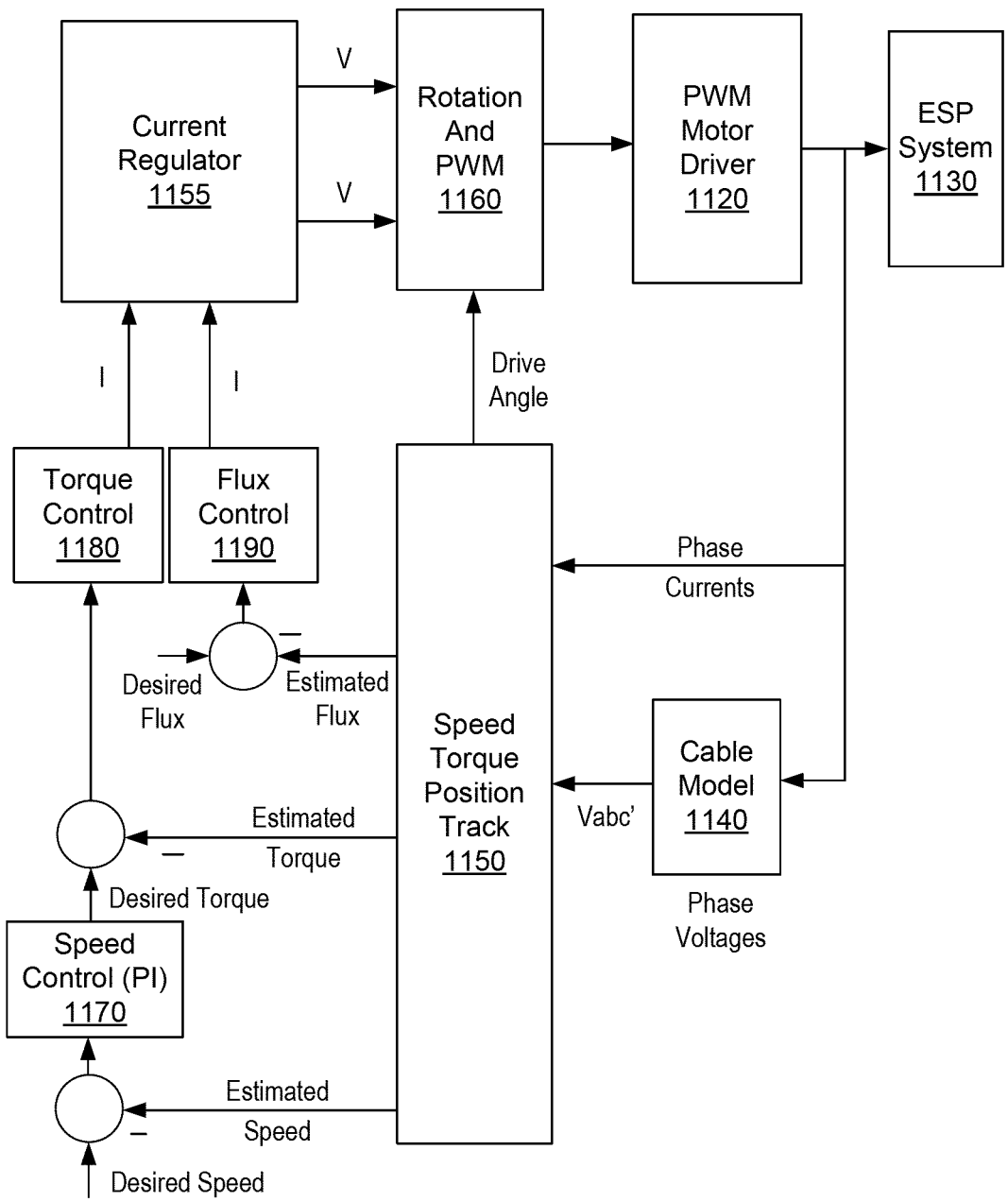
FIG. 11 illustrates an example of a system.

FIG. 11 shows an example of a system 1100 for closed loop torque control. As shown, the system 1100 includes a PWM motor driver block 1120, an ESP system block 1130, a cable model block 1140, a speed, torque and position track block 1150, a current regulator block 1155, a rotation and PWM block 1160, a speed control block 1170, a torque control block 1180, and a flux control block 1190.

As shown, in the example of FIG. 11, torque control with vector oriented control is implemented. In such an example, speed estimation is provided for both speed control and torque control. As an example, a change in rotor time constant affects speed estimate and torque.

As may be understood with respect to FIGS. 9 and 10, speed tracking may be possible in open loop operation. However tracking of stator resistance and rotor resistance may be achieved where currents vary (e.g., varying currents); because, under steady state conditions rotor and stator resistance tracking become ambiguous. As an example, speed estimator may be based on the nominal resistance and approximation based on the temperature coefficient and a temperature estimate from other sources.

However, as to compensation for cable asymmetry, it can be based on a similar principle as before. As an example, the effects of the asymmetry can be accounted for by accounting for the asymmetrical voltage drop across the cable. In such an example, the tracking filter can then be based on a symmetrical motor model.

Figure 12:
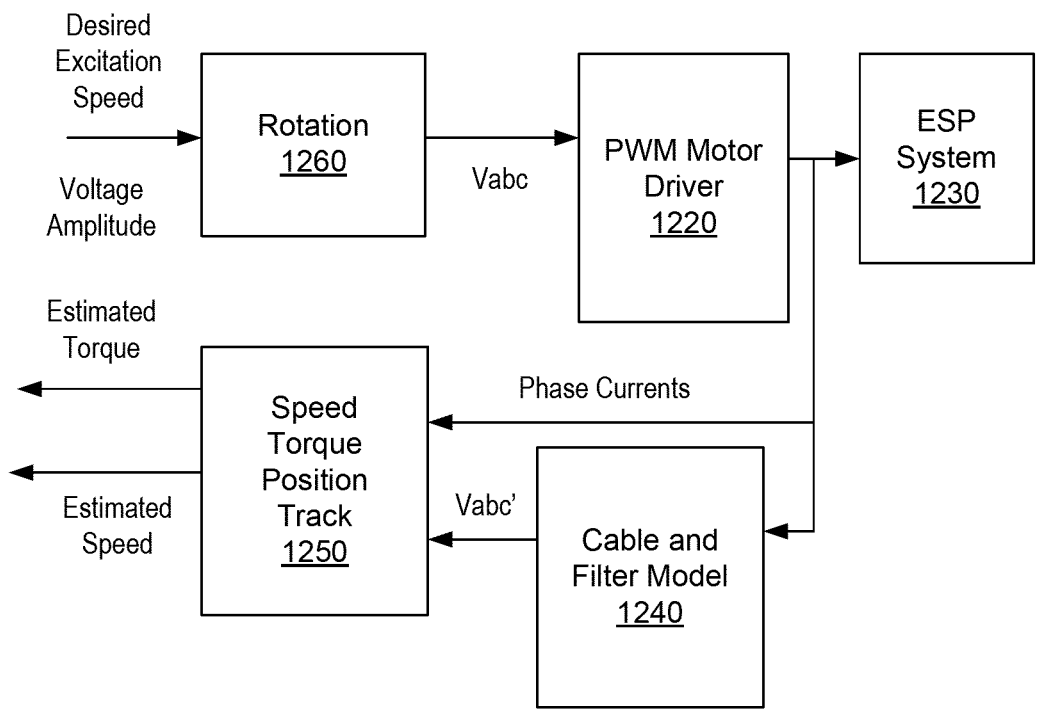
FIG. 12 illustrates an example of a system.

FIG. 12 shows an example of a system 1200 for open loop operation, for example, for speed and torque estimation in open loop operation. As shown, the system 1200 includes a PWM motor driver block 1220, an ESP system block 1230, a cable and filter model block 1240, a speed, torque and position track block 1250 and a rotation block 1260.

In the example of FIG. 12, there is still an option as to how to track the rotor and stator resistance. If there is not enough load fluctuation for tracking, even in open loop an extra tone can be implemented in the driver. The extra tone of the drive voltage will create a fluctuation on the stator currents that can then be used for tracking. However in open loop operation it may add a torque ripple.

As to PMS motors, they tend to be not as complex as IM motors. As an example, cable and stator impedances can be combined for control or tracking.

Figure 13:
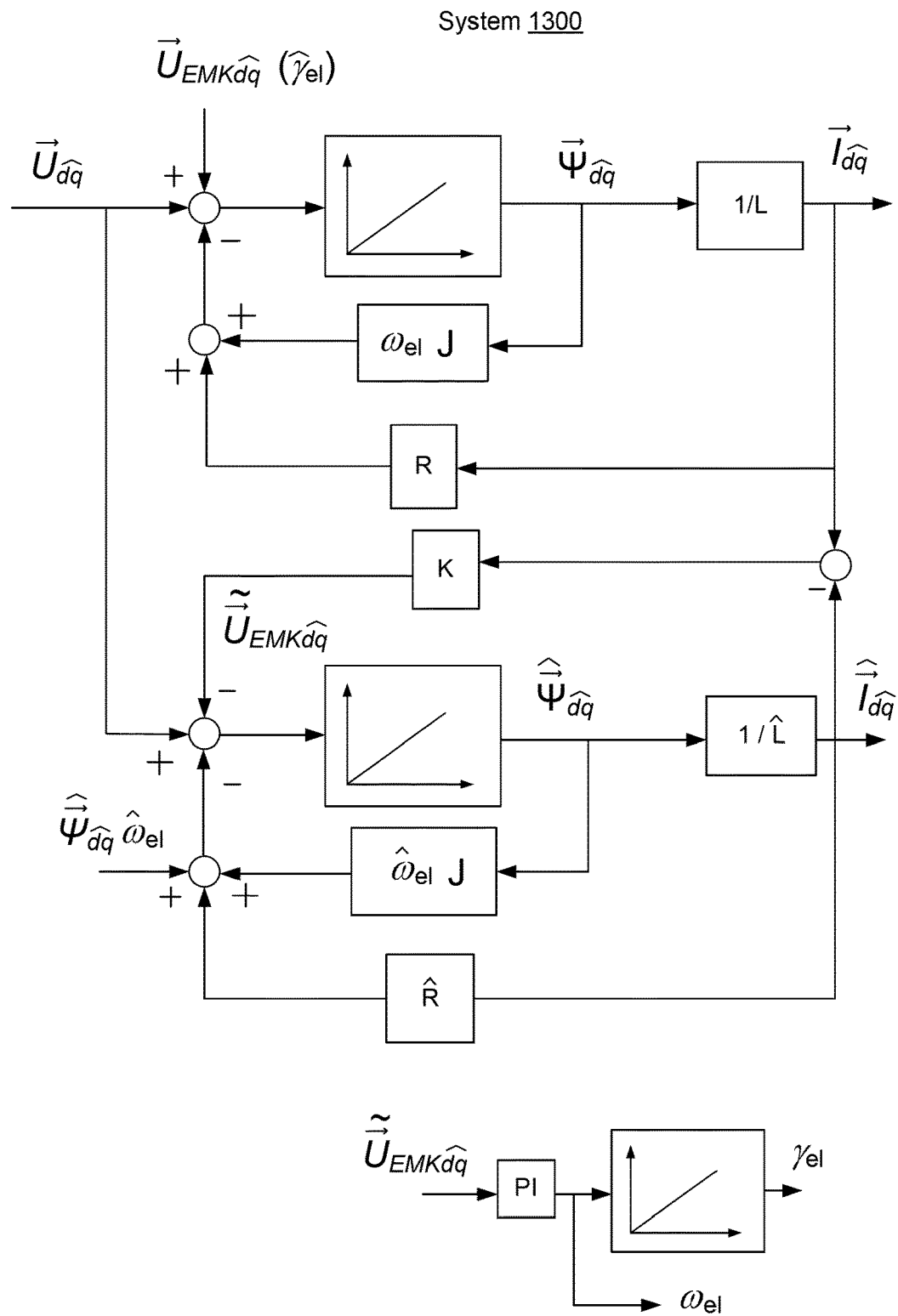
FIG. 13 illustrates an example of a system.

FIG. 13 shows a block diagram of a system 1300 for current prediction based position estimator in rotor coordinates. The fact that the resistance cable resistance changes a lot can have an impact that may benefit from compensation. As an example, an observer can be extended to adapt for cable resistance change as well. For example, it is possible to inject a low frequency signal in a direction of the rotor. In such an example, additional voltage drop created along the cable accounts for the resistance.

As an example, the system 1300 of FIG. 13 may be considered an example embodiment of a current predictor based tracking filter. The drive voltage is applied to the plant model, at the same time it is projected into the estimated rotor position. A reference model with nominal or estimated system parameters is predicting the response of the system to the excitation by the drive voltage. The error between measured and predicted current is used to calculate a back EMF prediction error to adjust for the discrepancy in the model. The back EMF error has after linearization a dependency on the angle error in d direction and on speed error in q direction. Both contributors can be combined with a weight factor and used in a PLL. The PLL will track the speed and after integration the angle.

As to nomenclature, consider the following:
$\bar{u}_{EMK\bar{a}_q}$: True back EMF
$\tilde{u}_{EMK\bar{a}_q}$: Back EMF prediction error
$\hat{\gamma}_{el}$: Estimated electrical rotor angle
$\bar{U}_{\bar{a}_q}$: Drive voltage in estimated rotor coordinates, based on angle estimation
$\bar{I}_{\bar{a}_q}$: Measured current in estimated coordinates, based on angle estimation
$\bar{\psi}_{\bar{a}_q}$: True Flux in plant in true position
L: True Phase Inductance
$\omega_{el}$: True electrical motor speed
R: True phase resistance
K: observer gain
$\hat{I}_{\bar{a}_q}$: Predicted current in estimated coordinates, based on angle estimation $\hat{\psi}_{\bar{a}_q}$: Predicted Flux in plant in estimated position
$\hat{L}$: Nominal inductance
$\hat{\psi}_{PM}$: Nominal field constant
$\hat{\omega}_{el}$: Estimated electrical motor speed
$\hat{R}$: Nominal resistance, or estimated resistance from adaptive tracker As an example, rotor shaft reliability improvement may be accomplished in a closed loop regulator design. For example, speed regulator may be dominated by inertia of a rotor and damping of a load. However tracking of the rotor speed adds an opportunity to design the speed control to include the dynamic model of the shaft. The regulator can be designed to provide extra damping in the resonance region of the shaft and therefore improve lifetime and reliability of the shaft. With the estimated speed and controllable actuation torque through the stator current sudden torque change can be minimized.

As an example, a startup strategy may include an open loop closed loop transition. A strategy for induction motor open loop ramp up may be based on scalar methods where voltage is ramped up proportional to the frequency ramp up of the excitation.

$$V(t)=V_0+V_1\omega t e^{j\omega t}$$

$V_0$ is a constant that limits the startup current.
$V_1$ is the rate at which the voltage ramps up.
$\omega$ is continuously increasing until the target excitation frequency is reached.

Such an approach can be considered to be a scalar or voltage per Hertz ramp up method. For example, it can attempt to avoid tripping over-current protection by ramping up voltage and slip slowly with the assumption that the rotor has started to ramp up speed by the time voltage and the slip are sufficiently high.

As an example, a method akin to the foregoing may be implemented for PMS motors, for example, based at least in part on a self-regulating mechanism of a PMS motor. As to a PMS motor, consider the following equation:

$$V(t)=V_0+\phi_f\omega t e^{j\omega t}$$

$V_0$ is a constant that limits the phase current.
$\omega$ is continuously increasing until the target excitation frequency is reached.

In such an approach, the rate of voltage ramp up corresponds to the ramp up of the back EMF. Such methods achieve suitable results if the rotor ramps up acceptably; noting that overdesign of the drive may help to avoid over-currents that can go to the limit of the drive. For PMS, overdrive of the system can occur so that enough startup torque is developed. As speed ramps up, this method may be sensitive to misfiring; noting that at higher voltages, small misalignments may create large current spikes.

Figure 14:
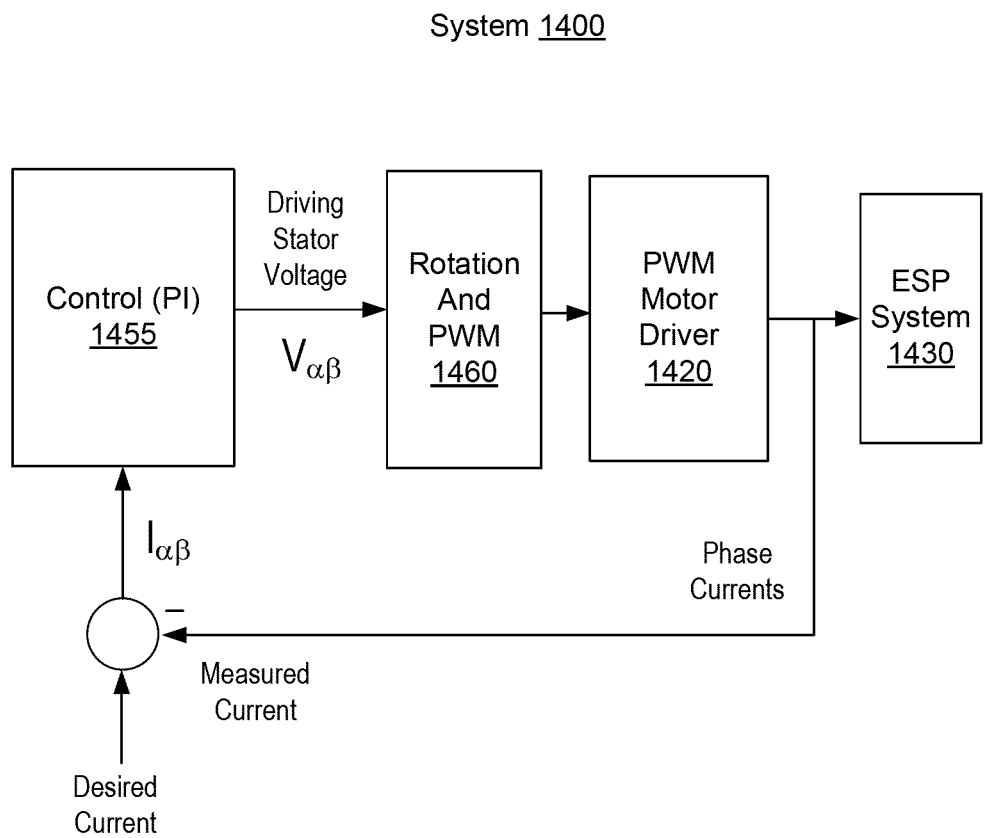
FIG. 14 illustrates an example of a system.

FIG. 14 shows an example of a system 1400 that may be implemented for active current controlled ramp up. As shown, the system 1400 includes a PWM motor driver block 1420, an ESP system block 1430, a control block 1455 and a rotation and PWM block 1460.

As an example, to ramp up in a more controlled way for both IM and PMS motor, the voltage ramping up current through a control loop can create a more controlled way to limit the current. In such an example, voltage may automatically ramp up through the output of a PI regulator (see, e.g., block 1455). Since there is more mitigation against overcurrent, the nominal ramp up current can be much higher and much closer to the overall current limit of the system, which means more robustness and reduced design consideration as to oversize the drive capability. For PMS motors it may also help to guarantee for the same condition higher torque, which can result in less probability for slip and less rotor speed ripple:

$$I(t) = I_{max}e^{j\omega t}$$

In this case, the current ramps up fast and then stays constant while ω is continuously increasing. The driven voltage will still ramp up with the speed, but, for example, automatically adjust to stay close to the maximum current.

As an example, an approach may include open loop closed loop transition(s). For example, while ramping up speed, the tracking filters can be running, and once the signal noise ratio is sufficiently high and the convergence of the tracking filters can be trusted, the system can switch to closed loop. As an example, during ramp down of speed, a system may be instructed to switch back to open loop, for example, at a point when the tracking filters lack trust (e.g., insufficient signal to noise).

In a transition, a sudden discontinuity may occur that may create sudden jumps in driver signals that may possibly lead to overcurrent conditions. As an example, to mitigate such an issue, the integrator implementation of PI controls may be initialized for continuity. For example, consider the following equations:

$$E_{rr\_1} = I_{1\_desired} - I_{1\_estimated}$$

$$V_{k+1} = K_p E_{rr\_i} + K_i \sum_{i=0}^{k+1} E_{rr\_i}$$

$$Acc_{K+1} = \sum_{i=0}^{k+1} E_{rr\_i}$$

$$Acc_1 = \frac{V_0 - K_p E_{rr\_i}}{K_i}$$

$Acc_1$: Accumulator state when regulator starts $V_0$: Last regulator state in open loop $I_k$: state of regulated signal, measured or estimated $E_{rr\_k}$: Error signal Such an approach means, when the control becomes active, the integrator is designed for the output to stay continuous at the first sample of closing the loop.

As an example, various approaches may be implemented for PMS. For example, there are different types of tracking speed tracking filters. Sliding mode observers and flux estimators may be more straightforward to implement and to design, however with limited performance. Current or flux predictor based tracking may be implemented; however, design may be more complex. Extended Kalman filters may be considered; however, the quality of the tracked speed may be balanced against an implementation effort.

As an example, as to other IM motor speed estimators, there are various types of speed estimators for induction motors. The basic principle may be to converge to a model state (and for adaptive filters also model parameter state), where the response to voltage excitation signals in the measured currents is consistent with the system model. In various examples, as explained, a tracking mechanism relates to a current prediction error.

Flux estimators with feedback structure may provide workable solutions; however, they do not tend to address cable asymmetry and parameter variation. MRAS speed observers may be more robust against parameter variation; however, changing stator and rotor resistance can contribute to substantial errors. Motor control based on sensorless speed and position estimation may be, for example, complemented by downhole speed and temperature sensors. In such an approach, steady state errors may be better compensated via sensor measurements.

Figure 15:
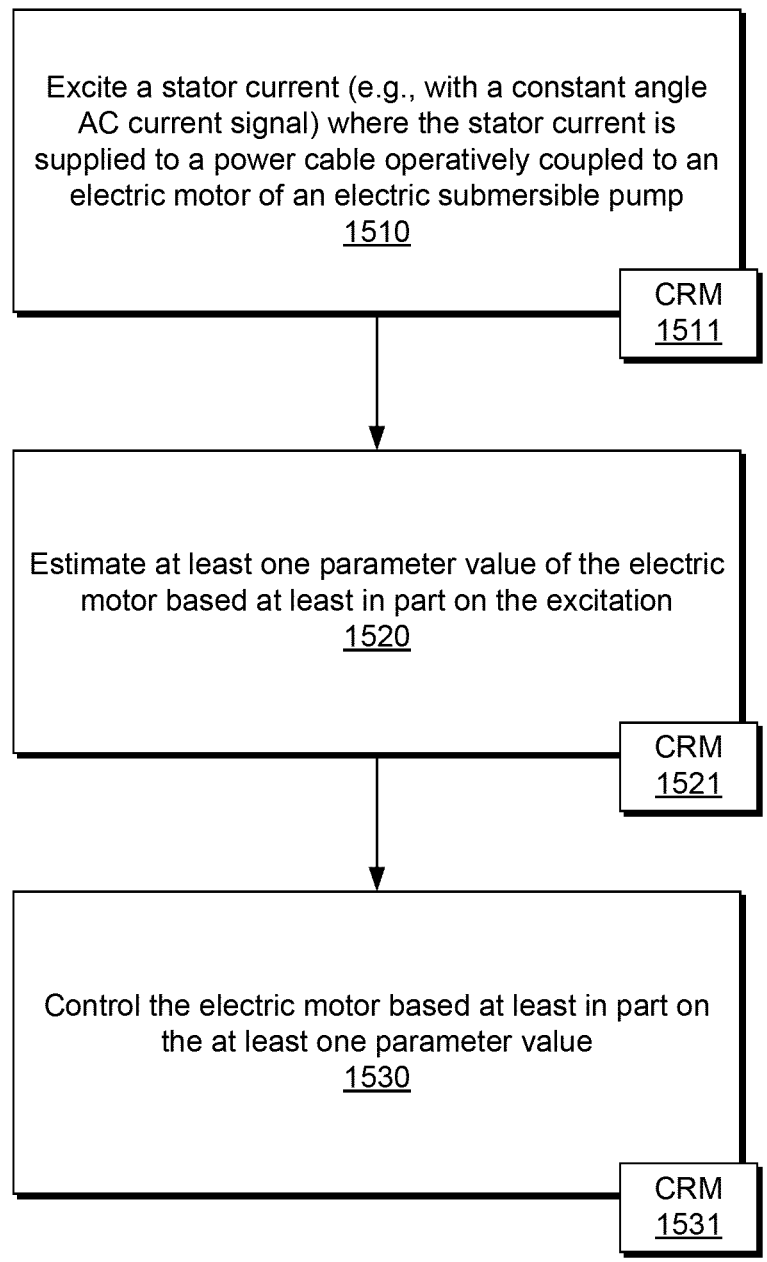
FIG. 15 illustrates an example of a method.

FIG. 15 shows an example of a method 1500 that includes an excitation block 1510 for exciting a stator current with a constant angle AC current signal where the stator current is supplied to a power cable operatively coupled to an electric motor of an electric submersible pump; a estimation block 1520 for, based at least in part on the exciting, estimating at least one parameter value of the electric motor; and, a control block 1530 for, based at least in part on the at least one parameter value, controlling the electric motor. In such an example, based at least in part on the at least one parameter value, the method 1500 can include estimating a pump rate of the electric submersible pump and/or one or more other types of information germane to the electric submersible pump, the power cable, the electric motor, etc.

As shown in FIG. 15, the method 1500 may be associated with various computer-readable media (CRM) blocks 1511, 1521 and 1531. Such blocks generally include instructions suitable for execution by one or more processors (or cores) to instruct a computing device or system to perform one or more actions. As an example, a single medium may be configured with instructions to allow for, at least in part, performance of various actions of the method 1500. As an example, a computer-readable medium (CRM) may be a computer-readable storage medium that is non-transitory and that is not a carrier wave. As an example, blocks may be provided as one or more modules, for example, such as the one or more modules 707 of FIG. 7.

As an example, a method may include operating an electric submersible pump by delivering power to an electric motor to rotate a shaft where impellers of a pump are operatively coupled to the shaft.

As an example, an electric submersible pump system can include a multiphase electric motor operatively coupled to a fluid pump; a multiphase power cable operatively coupled to the multiphase electric motor; and a controller that includes an input that receives measurements as to power supplied to the multiphase electric motor via the multiphase power cable and that processes the measurements to estimate a pump rate of the fluid pump. As an example, the pump rate may be a fluid flow rate. As an example, a fluid flow rate may be determined at least in part on a speed of rotation of a shaft of an electric motor that is operatively coupled to a pump. For example, a pump may be a multistage mixed flow pump that moves fluid radially and axially, to move the fluid axially along a longitudinal axis of the pump. As an example, current, voltage or current and voltage may be measured in a power distribution system (e.g., including a cable) to a downhole electric motor. In turn, a controller may process such measurements to determine one or more conditions, which may be rotation, temperature, etc. Such conditions may be used to estimate a pump rate (e.g., a rate of fluid flow in a pump). As an example, a feedback loop may be established that uses one or more measurements at a surface or other position of fluid being pumped by a pump. Such feedback may be used by a controller to estimate one or more values, etc., which may be related to pumping, pumped fluid, downhole conditions, etc. As an example, closed loop speed controlled operation may relate motor speed to pump flow and actuation torque to load pressure.

As an example, an electric submersible pump system can include a multiphase electric motor operatively coupled to a fluid pump; a multiphase power cable operatively coupled to the multiphase electric motor; and a controller that includes an input that receives measurements as to power supplied to the multiphase electric motor via the multiphase power cable and that processes the measurements to estimate a pump rate of the fluid pump. In such an example, the controller can include an output that outputs information to control power supplied to the multiphase power cable, for example, where the information is based at least in part on processing of at least one of the measurements.

As an example, a controller may be a closed loop controller and/or an open loop controller. As an example, a controller may be an IM motor controller and/or a PMS motor controller.

As an example, a controller can include or operate based at least in part on a state space-based model. As an example, a state space-based model can include rotor and stator resistance parameters that are dynamically adapted based at least in part on operational conditions of an electric submersible pump. As an example, a state space-based model can include a system variable vector and an excitation vector. As an example, a state space-based model can be or include a tracking model that includes a correction term that is based at least in part on feedback gain and prediction error.

As an example, a controller can include a rotor speed estimator, which may be, for example, based at least in part on a state space-based model.

As an example, a controller may process measurements to estimate a temperature of the electric motor, for example, where the temperature estimate is based at least in part on a rotor time constant.

As an example, a controller may process measurements to output a control signal that controls the electric motor to reduce oscillation of the shaft, for example, where the control signal is a speed control signal.

As an example, a controller may process measurements to output at least one quality control metric, for example, consider a winding quality control metric and/or an insulation quality control metric (e.g., or one or more other metrics).

As an example, a method can include exciting a stator current with a constant angle AC current signal where the stator current is supplied to a power cable operatively coupled to an electric motor of an electric submersible pump; based at least in part on the exciting, estimating at least one parameter value of the electric motor; and, based at least in part on the at least one parameter value, controlling the electric motor. In such an example, based at least in part on the at least one parameter value, the method can include estimating a pump rate of the electric submersible pump. As an example, a method can include controlling a pump rate of the electric submersible pump, optionally based at least in part on one or more estimates of a pump rate.

As an example, one or more computer-readable storage media can include processor executable instructions where the instructions include instructions to instruct an electric submersible pump controller to excite a stator current with a constant angle AC current signal where the stator current is supplied to a power cable operatively coupled to an electric motor of an electric submersible pump; estimate at least one parameter value of the electric motor based at least in part on the excitation; and control the electric motor based at least in part on the at least one parameter value.

As an example, one or more control modules (e.g., for a controller such as the controller 230, the controller 250, etc.) may be configured to control an ESP (e.g., a motor, etc.) based at least in part on information as to one or more fluid circuits in that may exist between stages of a pump. For example, one or more of backspin, sanding, flux, gas lock or other operation may be implemented in a manner that accounts for one or more fluid circuits (e.g., as provided by diffusers with fluid coupling holes). As an example, a controller may control an ESP based on one or more pressure estimations for a fluid circuit or circuits (e.g., during start up, transients, change in conditions, etc.), for example, where a fluid circuit or circuits may act to balance thrust force.

As an example, one or more methods described herein may include associated computer-readable storage media (CRM) blocks. As an example, a computer-readable storage medium can be non-transitory and not a carrier wave. As an example, one or more CRM blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., for sensing, telemetry, etc.).

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 16:
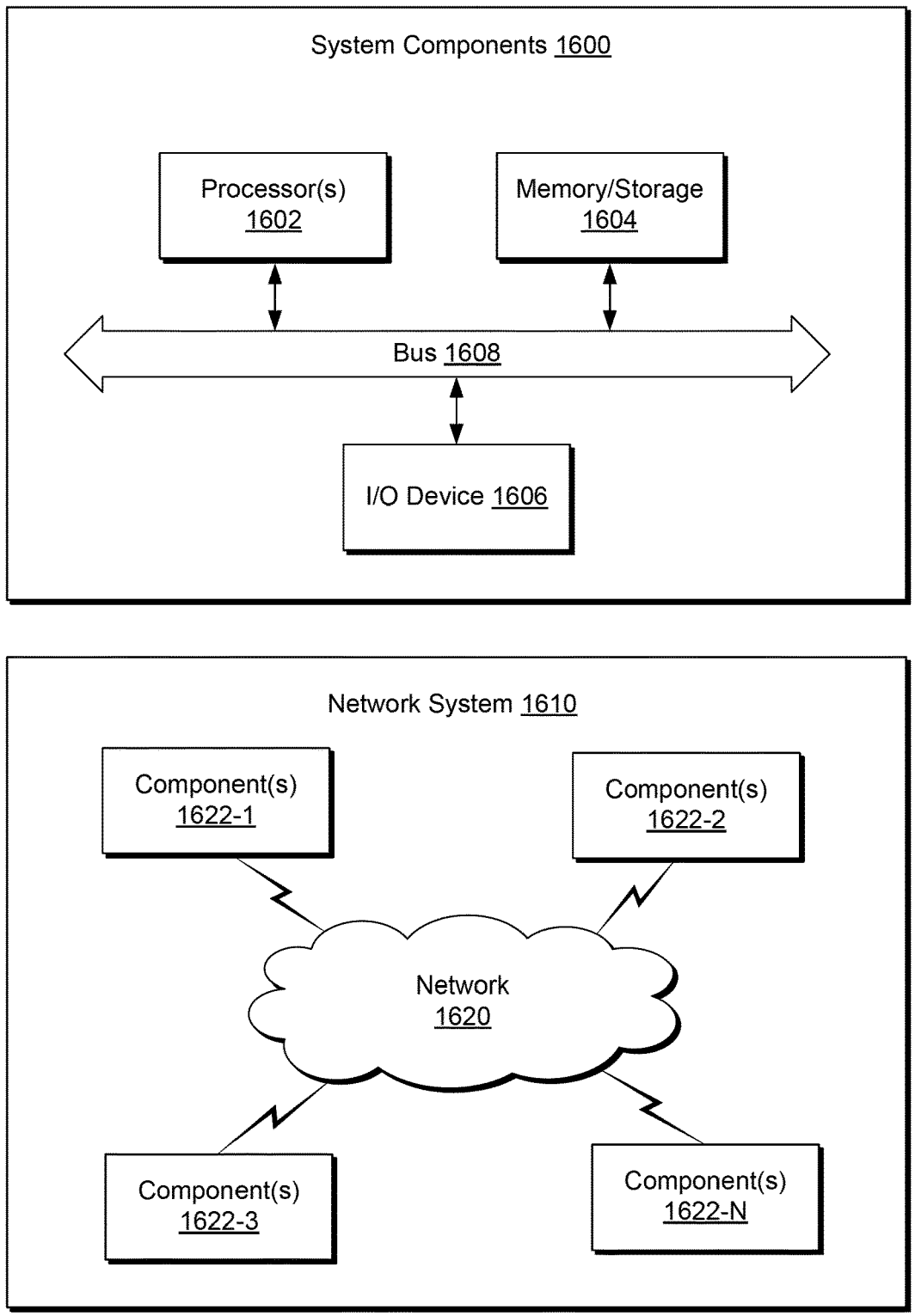
FIG. 16 illustrates example components of a system and a networked system.

FIG. 16 shows components of a computing system 1600 and a networked system 1610. The system 1600 includes one or more processors 1602, memory and/or storage components 1604, one or more input and/or output devices 1606 and a bus 1608. According to an embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). According to an embodiment, a computer-readable medium may be a storage component such as a physical memory storage device, for example, a chip, a chip on a package, a memory card, etc.

According to an embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

Conclusion

Although only a few examples have been described in detail above, those skilled in the art will readily appreciate that many modifications are possible in the examples.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A controller of a pump system, the controller comprising:
    an input that receives measurements as to power supplied to a multiphase electric motor via a multiphase power cable;
    circuitry to compensate for an asymmetry of the multiphase power cable on at least a portion of the measurements, and
    wherein the controller processes the measurements to estimate a pump rate of a pump driven by the multiphase electric motor.

2. The controller of claim 1, further comprising an output that outputs information to control the power supplied to the multiphase power cable.

3. The controller of claim 2, wherein the information is based at least in part on the processing of at least one of the measurements.

4. The controller of claim 1, wherein the multiphase electric motor comprises an IM motor.

5. The controller of claim 1, wherein the multiphase electric motor comprises a PMS motor.

6. The controller of claim 1, wherein the controller comprises a closed loop controller.

7. The controller of claim 1, wherein the controller comprises a state space-based model controller.

8. The controller of claim 7, wherein the state space-based model controller uses a model comprising rotor and stator resistance parameters that are dynamically adapted based at least in part on operational conditions of the pump.

9. The controller of claim 7, wherein the state space-based model comprises a system variable vector and an excitation vector.

10. The controller of claim 7, wherein the state space-based model is a tracking model that comprises a correction term that is based at least in part on feedback gain and prediction error.

11. The controller of claim 1, wherein the controller is a rotor speed estimator controller.

12. The controller of claim 1, wherein the controller processes the measurements to estimate a temperature estimate of the multiphase electric motor.

13. The controller of claim 12, wherein the temperature estimate is based at least in part on a rotor time constant.

14. The controller of claim 1, wherein the controller processes the measurements to output a control signal that controls the multiphase electric motor to reduce oscillation of a shaft of the multiphase electric motor connecting the multiphase electric motor to the pump.

15. The controller of claim 14, wherein the control signal is a speed control signal.

16. The controller of claim 1, wherein the controller processes the measurements to output at least one quality control metric.

17. The controller of claim 16, wherein the at least one quality control metric comprises at least one of a winding quality control metric and an insulation quality control metric.

18. A method of providing a controller of a pump system, the method comprising:
    providing an input of the controller, wherein the input is configured to receive measurements as to power supplied to a multiphase electric motor via a multiphase power cable; and
    providing circuitry to compensate for an asymmetry of the multiphase power cable on at least a portion of the measurements,
    wherein the controller processes the measurements to estimate a pump rate of a pump driven by the multiphase electric motor.

19. The method of claim 18 further comprising:
    providing an output that outputs information to control the power supplied to the multiphase power cable.

20. An electric submersible pump system comprising:
    a controller that comprises an input that receives measurements as to power supplied to a multiphase electric motor via a multiphase power cable, the controller configured to:
    process the measurements to estimate a pump rate of a fluid pump driven by the multiphase electric motor;
    compensate for an asymmetry of the multiphase power cable on at least a portion of the measurements; and
    estimate the pump rate of the fluid pump without input from downhole sensors.

* * * * *